(12) United States Patent
Nobukawa et al.

(10) Patent No.: US 10,337,372 B2
(45) Date of Patent: Jul. 2, 2019

(54) EXHAUST GAS PURIFICATION CATALYST DEVICE, EXHAUST GAS PURIFICATION SYSTEM, AND METHOD FOR DETECTING DETERIORATION OF EXHAUST GAS PURIFICATION CATALYST DEVICE

(71) Applicant: TOYOTA JIDOSHA KABUSHIKI KAISHA, Toyota-shi, Aichi-ken (JP)

(72) Inventors: Takeshi Nobukawa, Toyota (JP); Kazunari Sawada, Kakegawa (JP); Hirotaka Ori, Kakegawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/426,508

(22) Filed: Feb. 7, 2017

(65) Prior Publication Data

US 2017/0234185 A1    Aug. 17, 2017

(30) Foreign Application Priority Data

Feb. 12, 2016 (JP) .................................. 2016-025367

(51) Int. Cl.
*F01N 3/10* (2006.01)
*F01N 3/08* (2006.01)
(Continued)

(52) U.S. Cl.
CPC ........... *F01N 3/101* (2013.01); *F01N 3/0814* (2013.01); *F01N 3/0842* (2013.01);
(Continued)

(58) Field of Classification Search
CPC ...... F01N 3/101; F01N 3/0814; F01N 3/0842; F01N 3/2066; F01N 11/00;
(Continued)

(56) References Cited

U.S. PATENT DOCUMENTS

2004/0000135 A1*  1/2004  Uchida .................. F01N 3/101
                                                         60/277
2004/0001781 A1*  1/2004  Kumar ..................... B01J 23/44
                                                         422/180
(Continued)

FOREIGN PATENT DOCUMENTS

JP    2006-297372 A    11/2006
JP    5156823 B2        3/2013
JP    2013-136032 A     7/2013

*Primary Examiner* — Laert Dounis
*Assistant Examiner* — Kelsey L Stanek
(74) *Attorney, Agent, or Firm* — Oliff PLC

(57) ABSTRACT

An object of the present disclosure is to provide an exhaust gas purification catalyst device; an exhaust gas purification system; and a method for detecting deterioration of the above device.

The exhaust gas purification catalyst device includes a substrate, a first catalyst layer containing Pd and formed on the substrate, and a second catalyst layer formed on the first layer. Regarding the above device, ceria, Pd, and Rh are contained in a mixed state in the second layer; in the first and second layers, the total mass of ceria having a fluorite-type structure per 1 L volume of the substrate is 16.0 g or less; and in the second layer, the mass of Pd per 1 L volume of the substrate is 0.32 g or more.

11 Claims, 6 Drawing Sheets

(51) Int. Cl.
*F01N 3/20* (2006.01)
*F01N 11/00* (2006.01)

(52) U.S. Cl.
CPC ............ *F01N 3/2066* (2013.01); *F01N 11/00* (2013.01); *F01N 2430/06* (2013.01); *F01N 2510/0684* (2013.01); *F01N 2550/02* (2013.01); *F01N 2900/04* (2013.01); *Y02T 10/22* (2013.01); *Y02T 10/24* (2013.01); *Y02T 10/47* (2013.01)

(58) Field of Classification Search
CPC ............. F01N 2430/06; F01N 2550/02; F01N 2900/04; Y02T 10/22; Y02T 10/24; Y02T 10/47
USPC .......................................... 60/274; 422/177
See application file for complete search history.

(56) References Cited

U.S. PATENT DOCUMENTS

| | | |
|---|---|---|
| 2006/0217263 A1 | 9/2006 | Kawamoto et al. |
| 2009/0193796 A1* | 8/2009 | Wei .................... B01D 53/9445 60/297 |
| 2010/0135879 A1 | 6/2010 | Roesch et al. |
| 2010/0183490 A1* | 7/2010 | Hoke ................... B01D 53/945 423/213.5 |
| 2014/0357480 A1 | 12/2014 | Aoki |
| 2015/0174529 A1* | 6/2015 | Irisawa ............. B01D 53/9477 422/114 |
| 2017/0014766 A1* | 1/2017 | Schoenhaber ..... B01D 53/9477 |

* cited by examiner

_US 10,337,372 B2_

EXHAUST GAS PURIFICATION CATALYST DEVICE, EXHAUST GAS PURIFICATION SYSTEM, AND METHOD FOR DETECTING DETERIORATION OF EXHAUST GAS PURIFICATION CATALYST DEVICE

TECHNICAL FIELD

The present disclosure relates to an exhaust gas purification catalyst device, an exhaust gas purification system, and a method for detecting deterioration of an exhaust gas purification catalyst device.

BACKGROUND ART

An exhaust gas from a vehicle, for example, an automobile, contains components such as carbon monoxide (CO), hydrocarbon (HC), nitrogen oxide (NOx), a particulate matter (PM), etc. These components in an exhaust gas may result in environmental pollution, for example, air pollution, smog or acid rain, and the amount of automotive exhaust gas emissions is therefore regulated in various countries.

In order to prevent discharging of these exhaust gas components into the atmosphere, various catalyst devices have been developed. An exhaust gas purification system equipped with such a catalyst device is also known. For example, an exhaust gas purification system is known, in which a Start Converter (SC) catalyst device, a NOx Storage Reduction (NSR) catalyst device, and a Selective Catalytic Reduction (SCR) catalyst device are arranged in this order along an exhaust passage for exhaust gas discharged from an engine.

This system can effectively purify the components above, such as carbon monoxide, even when the exhaust gas is changed among rich, stoichiometric, and lean atmospheres. The rich atmosphere, the stoichiometric atmosphere, and the lean atmosphere refer to atmospheres where the air-fuel ratio is less than the theoretical air-fuel ratio, is the theoretical air-fuel ratio, and is more than the theoretical air-fuel ratio, respectively. For example, a relatively large amount of a reducing agent (e.g., CO and HC) is contained in the exhaust gas under a rich atmosphere; a relatively large amount of an oxidizing agent (e.g., NOx) is contained in the exhaust gas under a lean atmosphere; and the reducing and oxidizing agents which have chemical equivalent amounts are contained in the exhaust gas under a stoichiometric atmosphere.

There is a possibility that the exhaust gas purifying performance of such a system or a start converter catalyst device contained therein can be further improved.

The exhaust gas purification catalyst device of Patent Document 1 includes a first catalyst layer containing an oxygen storage material as a support and Pd; and a second catalyst layer containing an oxygen storage material as a support, Pd and Rh and formed on a surface of the first catalyst layer. In this exhaust gas purification catalyst device, at least a part of Pd particles contained in the first and second catalyst layers is supported on the oxygen storage material.

PRIOR ART DOCUMENTS

Patent Document

Patent Document 1
  Japanese Unexamined Patent Publication No. 2013-136032

SUMMARY OF THE DISCLOSURE

Problems to be Solved by the Disclosure

Patent Document 1 describes that, when the amount of Pd contained in the second catalyst layer is large, Pd and Rh are alloyed to decrease the NOx purifying performance of Rh.

Accordingly, an object of the present disclosure is to provide an exhaust gas purification catalyst device having an enhanced exhaust gas purifying performance, an exhaust gas purification system into which the device is incorporated, and a method for detecting deterioration of the exhaust gas purification catalyst device.

Means to Solve the Problems

The present inventors have found that the above-described object can be attained by the following techniques.

A first aspect of the present disclosure relates to an exhaust gas purification catalyst device including a substrate, a first catalyst layer containing Pd and formed on a surface of the substrate, and a second catalyst layer formed on a surface of the first catalyst layer,
  wherein, in the second catalyst layer, ceria, Pd, and Rh are contained in a mixed state in the same layer,
  wherein, in the first and second catalyst layers, the total mass of ceria having a fluorite-type structure per 1 L volume of the substrate is 16.0 g or less, and
  wherein, in the second catalyst layer, the mass of Pd per 1 L volume of the substrate is 0.32 g or more.

A second aspect of the present disclosure relates to the exhaust gas purification catalyst device according to the first aspect,
  wherein, in the second catalyst layer, a part of or all of the Pd particles is supported on the ceria.

A third aspect of the present disclosure relates to the exhaust gas purification catalyst device according to the first aspect or second aspect,
  wherein the second catalyst layer further contains alumina, and
  wherein, in the second catalyst layer, a part of or all of the Pd particles is supported on the alumina.

A fourth aspect of the present disclosure relates to the exhaust gas purification catalyst device according to any one of the first through third aspects,
  wherein, in the first and second catalyst layers, the total mass of ceria having a fluorite-type structure per 1 L volume of the substrate is 0.0 g or more.

A fifth aspect of the present disclosure relates to the exhaust gas purification catalyst device according to any one of the first through fourth aspects,
  wherein, in the second catalyst layer, the mass of Pd per 1 L volume of the substrate is 0.64 g or less.

A sixth aspect of the present disclosure relates to an exhaust gas purification system including an internal combustion engine for emitting an exhaust gas, a first catalyst device for treating the exhaust gas, and a second catalyst device for treating the exhaust gas treated in the first catalyst device,
  wherein, the first catalyst device is the exhaust gas purification catalyst device according to any one of the first through fifth aspects, and
  wherein the second catalyst device is a catalyst device selected from the group consisting of a three-way catalyst device, a NOx storage reduction catalyst device, and a selective catalytic reduction catalyst device.

A seventh aspect of the present disclosure relates to the exhaust gas purification system according to the sixth aspect, further including a third catalyst device for treating the exhaust gas treated in the second catalyst device, wherein the third catalyst device is a catalyst device selected from the group consisting of a three-way catalyst device, a NOx storage reduction catalyst device, and a selective catalytic reduction catalyst device.

An eighth aspect of the present disclosure relates to the exhaust gas purification system according to the seventh aspect, wherein the second catalyst device is a NOx storage reduction catalyst device, and wherein the third catalyst device is a selective catalytic reduction catalyst device.

A ninth aspect of the present disclosure relates to the exhaust gas purification system according to any one of the sixth through eighth aspects, wherein the internal combustion engine is a lean burn engine.

A tenth aspect of the present disclosure relates to a method for detecting deterioration of an exhaust gas purification catalyst device, which is a method for detecting deterioration of the first catalyst device in the exhaust gas purification system according to any one of the sixth through ninth aspects, including:

supplying a rich-atmosphere exhaust gas to the first catalyst device, then supplying a lean-atmosphere exhaust gas with an oxygen concentration of 1 to 2% to the first catalyst device, and while supplying the lean-atmosphere exhaust gas, estimating the amount of oxygen consumed in the first catalyst device.

An eleventh aspect of the present disclosure relates to the method for detecting deterioration of an exhaust gas purification catalyst device according to the tenth aspect, wherein the air-fuel ratio of the rich-atmosphere gas is from 12.5 to 13.7.

Effects of the Disclosure

According to the present disclosure, an exhaust gas purification catalyst device having an enhanced exhaust gas purifying performance, an exhaust gas purification system into which the device is incorporated, and a method for detecting deterioration of the exhaust gas purification catalyst device can be provided.

DETAILED DESCRIPTION OF THE DISCLOSURE

Figure 1:
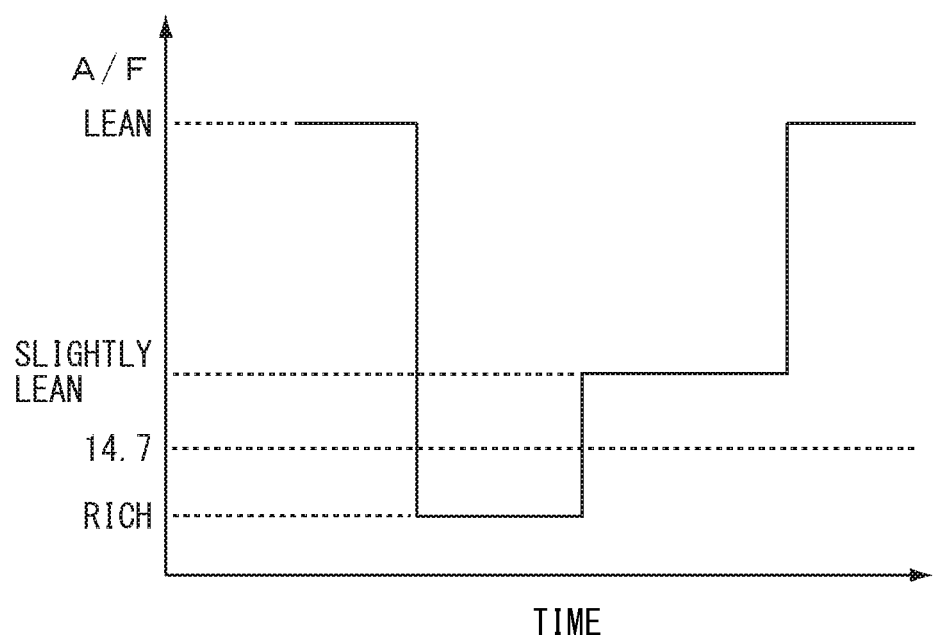
FIG. 1 is a schematic diagram illustrating the relationship between the air-fuel ratio (A/F) of an exhaust gas discharged from an engine and the time, regarding the method of the present disclosure for detecting deterioration of an exhaust gas purification catalyst device.

The embodiments of the present disclosure are described in detail below. The present disclosure is not limited to the following embodiments and can be implemented by making various modifications without departing from the scope of the present disclosure. Furthermore, the dimensional ratio in the drawings is modified for convenience of explanation and may differ from an actual ratio.

In the present disclosure, the "volume of substrate" refers to a volume of the substrate, including pores of a honeycomb structure.

Properties of Rh

On the one hand, Rh is a metal having a high ability to catalyze a NOx reduction reaction, and, on the other hand, a metal being relatively easy to be oxidized. For example, in a lean atmosphere, fine Rh particles are substantially in the oxidized state. The fine Rh oxide particles are reduced to fine Rh metal particles when being exposed to a rich atmosphere. It is believed that these fine Rh metal particles exhibit the NOx reducing ability of Rh. More specifically, in order for fine Rh particles to effectively catalyze the NOx reduction reaction in a rich atmosphere, the fine Rh particles must be in the metal state but not in the oxide state.

Properties of Ceria

Ceria has OSC (Oxygen Storage Capacity) properties of storing oxygen in a lean atmosphere and releasing oxygen in a rich atmosphere. Ceria as an OSC material can therefore be suitably adopted in a three-way catalyst, etc. Furthermore, ceria in the oxygen stored state may be referred to as ceria of a cubic fluorite-type structure ($CeO_2$ type), and ceria in the oxygen released state may be referred to as ceria of a hexagonal fluorite-type structure ($Ce_2O_3$ type).

According to this OSC performance of ceria, there is a possibility that, in a rich atmosphere, a large amount of ceria suppresses reduction of fine Rh oxide particles themselves and the efficiency of catalyzing a NOx reduction reaction by the fine Rh metal particles is insufficient.

Properties of Pd

On the one hand, Pd is a metal that can catalyze an oxidation reaction of HC or CO and on the other hand, a metal being relatively easy to be alloyed with Rh. The ability of Rh to catalyze a NOx reduction reaction may be lowered when Pd and Rh are alloyed.

According to the properties of Pd, there is a possibility that, when the amount of Pd, in particular, the amount of Pd relative to the amount of Rh, is relatively large, Rh and Pd are alloyed, and therefore the ability of Rh to catalyze a NOx reduction reaction is lowered.

The present inventors have studied on the relationship of ceria, Rh, and Pd and found the following exhaust gas purification catalyst device.

Exhaust Gas Purification Catalyst Device of the Present Disclosure

Feature 1 of Exhaust Gas Purification Catalyst Device of the Present Disclosure

The exhaust gas purification catalyst device of the present disclosure includes a substrate; a first catalyst layer containing Pd and formed on a surface of the substrate; and a second catalyst layer formed on a surface of the first catalyst layer. In this exhaust gas purification catalyst device: in the second catalyst layer, ceria, Pd, and Rh are contained in a mixed state in the same layer; and, in the first and second catalyst layers, the total mass of ceria having a fluorite-type structure per 1 L volume of the substrate is 16.0 g or less.

In this exhaust gas purification catalyst device of the present disclosure, in the first and second catalyst layers, the total mass of ceria having a fluorite-type structure per 1 L volume of the substrate is sufficiently small. Accordingly, in a rich atmosphere, ceria does not substantially suppress the reduction of a Rh oxide, and a Rh metal can sufficiently catalyze the NOx reduction reaction.

Thus, in the first and second catalyst layers, the total mass of ceria having a fluorite-type structure per 1 L volume of the substrate may be 16.0 g or less, 15.0 g or less, 14.0 g or less, 13.0 g or less, or 10.0 g or less.

In this exhaust gas purification catalyst device of the present disclosure, the first and second catalyst layers optionally contain ceria of the above-described structure under an amount not suppressing the reduction of a Rh oxide. Accordingly, a lean atmosphere and a rich atmosphere can be brought close to around a stoichiometric atmosphere by ceria, thereby collectively purifying HC, CO, and NOx, and/or a Rh metal can sufficiently catalyze the NOx reduction reaction in a rich atmosphere.

For this reason, the total mass of ceria of the above-described structure in the first and second catalyst layers, per 1 L volume of the substrate, may be, although is not particularly limited to, 0.0 g or more, more than 0.0 g, 1.0 g or more, or 3.0 g or more.

Examples of the structure of ceria can include a fluorite-type structure and a pyrochlore-type structure. The oxygen storage rate and oxygen release rate of ceria having a fluorite-type structure are relatively high. Accordingly, this ceria has high sensitivity regarding the change between a lean atmosphere and a rich atmosphere, and these atmospheres may be rapidly brought close to around a stoichiometric atmosphere.

On the other hand, the oxygen storage rate and oxygen release rate of ceria having a pyrochlore-type structure are relatively low. Accordingly, this ceria has low sensitivity regarding the change between a lean atmosphere and a rich atmosphere, and these atmospheres may be slowly brought close to around a stoichiometric atmosphere.

The present inventors have therefore focused on ceria having a fluorite-type structure, which functions as a main OSC material and has a great effect on Rh and Pd, in particular, on Rh, and found that it is preferable to specify the amount of this ceria.

Feature 2 of Exhaust Gas Purification Catalyst Device of the Present Disclosure

Furthermore, in the exhaust gas purification catalyst device of the present disclosure, in the second catalyst layer, the mass of Pd per 1 L volume of the substrate is 0.32 g or more.

As described above, the amount of ceria having a specific structure in the exhaust gas purification catalyst device is small, and the catalytic activity of Rh is therefore sufficiently exerted. Accordingly, the decrease in performance of Rh due to alloying with Pd can be substantially cancelled, and therefore the exhaust gas purification catalyst device of the present disclosure can contain a relatively large amount of Pd. When the amount of Pd is relatively large, an oxidation reaction of HC, etc., in a lean atmosphere, is facilitated, and the purification ratio of HC, etc., can therefore be improved.

For this reason, in the second catalyst layer, the mass of Pd per 1 L volume of the substrate may be 0.32 g or more, 0.35 g or more, 0.40 g or more, 0.45 g or more, or 0.51 g or more. Furthermore, the mass ratio of the mass of Pd contained in the second catalyst layer relative to the mass of Pd contained in the first catalyst layer may be 0.05 or more, 0.25 or more, 0.40 or more, 0.45 or more, or 0.48 or more.

In the exhaust gas purification catalyst device of the present disclosure, when the amount of Pd is relatively small, the catalytic activity of Rh can be sufficiently exerted.

For this reason, in the second catalyst layer, the mass of Pd per 1 L volume of the substrate may be, although is not particularly limited to, 0.64 g or less, 0.62 g or less, or 0.60 g or less. Furthermore, the mass ratio of the mass of Pd contained in the second catalyst layer relative to the mass of Pd contained in the first catalyst layer may be, although is not particularly limited to, 0.68 or less, 0.66 or less, or 0.64 or less.

With respect to Pd and Rh contained in the second catalyst layer, the mass ratio of the mass of Pd relative to the mass of Rh may be, although is not particularly limited to, 0.33 or more, 1.33 or more, 2.00 or more, 2.12 or more, 2.66 or more, or 3.00 or more, and may be 6.00 or less, 7.00 or less, 8.00 or less, 10.00 or less, or 12.64 or less.

In the case where the mass ratio above is relatively small, the proportion of Rh is large. Consequently, the purification of NOx in a rich atmosphere is facilitated. In the case where the mass ratio is relatively large, the proportion of Pd increases. Consequently, purification of HC in a lean atmosphere is facilitated.

As a result, the exhaust gas purification catalyst device of the present disclosure can exhibit a high exhaust gas purifying performance even when, in the second catalyst layer, ceria, Pd, and Rh are contained in a mixed state in the same layer.

Therefore, according to the present disclosure, an exhaust gas purification catalyst device having an enhanced exhaust gas purifying performance can be provided.

Optional Feature 1 of Exhaust Gas Purification Catalyst Device of the Present Disclosure In the exhaust gas purification catalyst device of the present disclosure, in the second catalyst layer, a part of or all of Pd particles is optionally supported on ceria.

The combination of Pd and ceria supporting it is suitable for oxidation of HC, etc. Consequently, the purification ratio of HC, etc., can be more enhanced.

Optional Feature 2 of Exhaust Gas Purification Catalyst Device of the Present Disclosure In the exhaust gas purification catalyst device of the present disclosure, in the second catalyst layer, alumina is further optionally contained, and a part of or all of Pd particles is supported on alumina.

The combination of Pd and alumina supporting it can decompose high-boiling-point HC in the exhaust gas and convert the high-boiling-point HC to low-boiling-point HC, CO, and $H_2$ each having a relatively high reduction performance. The reduction performance of these components is known to increase in the above order (i.e., reduction performance: high-boiling-point HC<low-boiling-point HC<CO<$H_2$). Accordingly, for example, in a rich atmosphere, high-boiling-point HC having a low reduction performance can be converted to low-boiling-point HC, CO, and $H_2$ each having a relatively high reduction performance, and these can be used as a reducing agent.

As a result, the combination of Pd and alumina supporting it can facilitate the reduction of Rh oxide or ceria even when the exhaust gas atmosphere is a slightly rich atmosphere.

The materials and elements constituting the exhaust gas purification catalyst device and the amounts, etc., thereof can be measured by an Inductively Coupled Plasma (ICP) emission spectroscopic analysis method.

The configuration, etc., of the exhaust gas catalyst device of the present disclosure are described below.

Configuration of Exhaust Gas Purification Catalyst Device of the Present Disclosure (Substrate)

The substrate has a gas flow path (also referred to as a pore) for passing an exhaust gas. The structure of the gas flow path may be, for example, a honeycomb structure, a foam structure, or a plate structure. Examples of the material for the substrate are not particularly limited, and the substrate may be made of a ceramic such as cordierite and SiC, and a metal, etc.

(First Catalyst Layer)

The first catalyst layer contains Pd, and, optionally, an catalyst metal, a support, and a sintering inhibitor.

The catalyst metal except for Pd and the support, and the amounts thereof, are not particularly limited as long as the functions and effects of Pd contained in the first catalyst layer and the functions and effects of ceria, Pd, and Rh contained in the second catalyst layer are not suppressed.

Examples of the support contained in the first catalyst layer can include, although are not particularly limited to, silica ($SiO_2$), magnesium oxide (MgO), zirconia ($ZrO_2$), ceria ($CeO_2$), alumina ($Al_2O_3$), titania ($TiO_2$), their solid solutions, and a combination thereof.

$SiO_2$ has favorable compatibility with a catalyst metal for catalyzing the NOx reduction reaction. MgO has favorable compatibility with K or Ba for storing NOx. $ZrO_2$ inhibits sintering of other powder supports, and furthermore, when being combined with Rh as a catalyst metal, $ZrO_2$ can cause a steam-reforming reaction to produce $H_2$. An acid/base amphoteric support, e.g., $Al_2O_3$, has a high specific surface area and functions as a diffusion barrier, and therefore this support can be used for enhancing the performance of the catalyst. $TiO_2$ can exert an effect of preventing sulfur poisoning of a catalyst metal.

The form of ceria may be a form of particles of ceria alone or a form of composite oxide particles containing ceria and/or a plurality of other oxides. The "composite oxide particle" refers to a material in which at least two kinds of metal oxides form at least partly a solid solution. Accordingly, for example, composite oxide particles each containing ceria and zirconia refer to that ceria and zirconia form at least partly a solid solution, ceria and zirconia together form at least partly an oxide of a single crystal structure. In other words, for example, the "composite oxide particles each containing ceria and zirconia" may have not only a portion where ceria and zirconia forms a solid solution, but also a portion where ceria and zirconia are individually present.

In the case where the form of ceria is a form of composite oxide particles containing ceria and/or a plurality of other oxides, the mass of ceria is a value calculated by multiplying the proportion (mass %) of ceria in composite oxide particles each containing it by the mass of the composite oxide particles. For example, the mass of ceria having a fluorite-type structure is a value calculated by multiplying the proportion (mass %) of ceria having a fluorite-type structure in composite oxide particles each containing it by the mass of the composite oxide particles.

The sintering inhibitor can inhibit sintering of supports with each other, sintering of catalyst metals with each other, and burying of a catalyst metal in a support. Examples of the sintering inhibitor may include, although are not particularly limited to, barium sulfate.

(Second Catalyst Layer)

The second catalyst layer contains ceria, Pd, and Rh, and optionally a catalyst metal, a support such as an alumina support, and a sintering inhibitor.

The catalyst metal except for Pd and Rh, the support except for ceria, and the amounts thereof are not particularly limited as long as the functions and effects of Pd contained in the first catalyst layer and the functions and effects of ceria, Pd, and Rh contained in the second catalyst layer are not inhibited.

With respect to the support contained in the second catalyst layer, the description of the support contained in the first catalyst layer may be referred to.

With respect to the sintering inhibitor contained in the second catalyst layer, the description of the sintering inhibitor contained in the first catalyst layer may be referred to.

With respect to the exhaust gas purification catalyst device of the present disclosure, the following description of the production method of the exhaust gas purification catalyst device; the following description of the exhaust gas purification system of the present disclosure; and the following description of the method for detecting deterioration of the exhaust gas purification catalyst device of the present disclosure may be referred to.

Production Method of Exhaust Gas Purification Catalyst Device

The method for producing the exhaust gas purification catalyst device includes, for example:

forming a first catalyst layer by applying a first catalyst layer slurry onto a substrate to form a first catalyst layer slurry layer and drying and/or calcining the first catalyst layer slurry layer; and forming a second catalyst layer by further applying a second catalyst layer slurry onto the first catalyst layer formed on a surface of the substrate to form a second catalyst layer slurry layer and drying and/or calcining the second catalyst layer slurry layer.

Forming First Catalyst Layer (Preparation and Application of First Catalyst Layer Slurry)

The step for forming a first catalyst layer may include an operation of preparing a first catalyst layer slurry.

The first catalyst layer slurry contains the materials contained in the first catalyst layer of the exhaust gas purification catalyst device of the present disclosure, and may also contain a solvent and a binder.

Examples of the solvent may include, although are not particularly limited to, water and ion-exchanged water. Examples of the binder may include, although are not particularly limited to, an alumina binder.

Examples of the method for applying a first catalyst layer slurry may include, although are not particularly limited to, a washcoat method.

(Drying, Etc., of First Catalyst Layer Slurry Layer)

The temperature, time, and atmosphere for drying the first catalyst layer slurry layer may be, for example, although are not particularly limited to, from 80 to 120° C., from 1 to 10 hours, and an air atmosphere. The temperature, time, and atmosphere for calcining the first catalyst layer slurry layer may be, for example, although are not particularly limited to, from 400 to 1,000° C., from 2 to 4 hours, and an air atmosphere.

Forming Second Catalyst Layer (Preparation and Application of Second Catalyst Layer Slurry, and Drying, Etc., of the Layer)

The step for forming a second catalyst layer may include an operation of preparing a second catalyst layer slurry.

With respect to the preparation and application of the second catalyst layer slurry and drying, etc., of the layer, the preparation and application of the first catalyst layer slurry and drying, etc., of the layer may be referred to.

With respect to the production method of the exhaust gas purification catalyst device, the above description of the exhaust gas purification catalyst device of the present disclosure; the following description of the exhaust gas purification system of the present disclosure; and the following description of the method for detecting deterioration of the exhaust gas purification catalyst device of the present disclosure may be referred to.

A conventional exhaust gas purification system and the exhaust gas purification system of the present disclosure are explained below.

Exhaust Gas Purification System

Conventional Exhaust Gas Purification System

With respect to an example of the conventional exhaust gas purification system, as described above, an exhaust gas purification system including an internal combustion engine, a start converter catalyst device (hereinafter, also referred to as SC catalyst device) as a first catalyst device, a NOx storage reduction catalyst device (hereinafter, also referred to as NSR catalyst device) as a second catalyst device, and a selective catalytic reduction catalyst device (hereinafter, also referred to as SCR catalyst device) as a third catalyst device, is known.

The internal combustion engine emits an exhaust gas. In the exhaust gas, in the case of a rich air-fuel ratio, HC or CO is contained in a relatively large amount, and in the case of a lean air-fuel ratio, NOx is contained in a relatively large amount.

The SC catalyst device, in particular, the SC catalyst device of a three-way catalyst type containing an OSC material can store oxygen in a lean atmosphere and release oxygen in a rich atmosphere, thereby creating a stoichiometric atmosphere and its neighborhood atmosphere. In the stoichiometric atmosphere and the atmosphere close thereto, the SC catalyst causes HC, CO and NOx to collectively react and be purified.

Furthermore, the SC catalyst device may produce ammonia ($NH_3$) by allowing nitrogen contained in the exhaust gas to react with hydrogen under a rich atmosphere.

The NSR catalyst device stores NOx contained in the exhaust gas under a lean atmosphere. Furthermore, the NSR catalyst device releases the stored NOx under a rich atmosphere. NOx released under a rich atmosphere is reduced by HC or CO. At this time, as with the above-described SC catalyst device, the NSR catalyst device may also produce $NH_3$.

The SCR catalyst device stores $NH_3$ produced by the SC catalyst device and NSR catalyst device under a rich atmosphere, and this $NH_3$ can be utilized in a lean atmosphere. Specifically, in the SCR catalyst device, $NH_3$ reacts with NOx in the exhaust gas under a lean atmosphere, and NOx is selectively reduced.

Accordingly, the conventional exhaust gas purification system can relatively efficiently purify HC, CO, and NOx in the exhaust gas.

However, in the conventional exhaust gas purification system, oxygen released from the OSC material contained in the SC catalyst device consumes a reducing agent in a rich atmosphere, and the NOx reduction efficiency may be therefore lowered in a catalyst device provided downstream of the SC catalyst device, for example, in a catalyst device such as NSR catalyst device and SCR catalyst device.

Exhaust Gas Purification System of the Present Disclosure

The exhaust gas purification system of the present disclosure includes an internal combustion engine for emitting an exhaust gas, a first catalyst device for treating the exhaust gas, and a second catalyst device for treating the exhaust gas treated in the first catalyst device. In this system, the first catalyst device is the exhaust gas purification catalyst device of the present disclosure, and the second catalyst device is a catalyst device selected from the group consisting of a three-way catalyst device, a NOx storage reduction catalyst device, and a selective catalytic reduction catalyst device.

As described above, in the exhaust gas purification catalyst device of the present disclosure, the total mass of ceria of a specific structure in the first and second catalyst layers, per 1 L volume of the substrate, is sufficiently small. Accordingly, in the exhaust gas purification catalyst device of the present disclosure, the amount of oxygen released under a rich atmosphere is small, and a reducing agent in a rich atmosphere can therefore be prevented from being consumed. In other words, when the exhaust gas purification catalyst device of the present disclosure is adopted to the exhaust gas purification system of the present disclosure, it is not necessary to use excess fuel in anticipation of a relatively large amount of oxygen released under a rich atmosphere.

Furthermore, as described above, the exhaust gas purification catalyst device of the present disclosure can catalyze the NOx reduction reaction and the HC oxidation reaction with high efficiency.

Accordingly, by employing the exhaust gas purification catalyst device of the present disclosure as the first catalyst device in the exhaust gas purification system of the present disclosure, a high NOx reduction efficiency can be achieved when the exhaust gas treated in the first catalyst device is treated in the second catalyst device, while allowing the first catalyst device to exert a high exhaust gas purifying performance.

Therefore, the exhaust gas purification system of the present disclosure can exert a higher exhaust gas purifying performance than the conventional exhaust gas purification system.

The exhaust gas purification system of the present disclosure optionally further includes a third catalyst device for treating the exhaust gas treated in the second catalyst device. The third catalyst device may be selected from the group consisting of a three-way catalyst device, a NOx storage reduction catalyst device, and a selective catalytic reduction catalyst device. Due to this configuration, the exhaust gas purifying performance can be more enhanced.

In the exhaust gas purification system of the present disclosure, it is preferred that the first catalyst device is the exhaust gas purification catalyst device of the present disclosure, the second catalyst device is a NOx storage reduction catalyst device, and the third catalyst device is a selective catalytic reduction catalyst device. Due to this configuration, $NH_3$ produced in the first and second catalyst devices can be efficiently used in the third catalyst device, and the exhaust gas purifying performance can therefore be enhanced.

With respect to the exhaust gas purification system of the present disclosure, the above description of the exhaust gas purification catalyst device of the present disclosure, the above description of the production method of the exhaust gas purification catalyst device, and the following description of the method for detecting deterioration of the exhaust gas purification catalyst device of the present disclosure may be referred to.

Method for Detecting Deterioration of Exhaust Gas Purification Catalyst Device of the Present Disclosure The method of the present disclosure for detecting deterioration of the first catalyst device in the exhaust gas purification system of the present disclosure includes supplying a rich-atmosphere exhaust gas to the first catalyst device, then supplying a lean-atmosphere exhaust gas with an oxygen concentration of 1 to 2% to the first catalyst device; and, while supplying the lean-atmosphere exhaust gas, estimating the amount of oxygen consumed in the first catalyst device.

Description of Conventional Method for Detecting Deterioration of Exhaust Gas Purification Catalyst Device In an exhaust gas purification catalyst device, in particular, in a SC catalyst device containing an OSC material, oxygen is released from the OSC material in a rich atmosphere, and the oxygen oxidizes HC, CO, etc., (oxygen reaction). In this SC catalyst device, the OSC material stores oxygen in a lean atmosphere (oxygen storage). As an example of the method for detecting deterioration of such a catalyst device, a method of measuring the total amount of the oxygen reaction amount and the oxygen storage amount (this total amount is also referred to as "oxygen consumption"), this measurement being performed before and after deterioration of the catalyst device, and calculating a difference value in the oxygen consumption of the catalyst device between before and after deterioration thereof, thereby detecting deterioration of the catalyst device, is known. However, in the case where the difference value is small, it may be difficult to detect the deterioration.

The reason why the difference value in the oxygen consumption becomes small may be, for example, that the volume of the exhaust gas purification catalyst device is small; that the amount of OSC material is small; and that since the concentration of oxygen supplied in a lean atmosphere is high, oxygen unconsumed in the catalyst device passes through the catalyst device, this oxygen is detected, thereby making it difficult to estimate the oxygen consumption.

Description of Method of the Present Disclosure for Detecting Deterioration of Exhaust Gas Purification Catalyst Device In the method of the present disclosure for detecting deterioration of the exhaust gas purification catalyst device, a rich-atmosphere exhaust gas is supplied to the first catalyst device, i.e., the exhaust gas purification catalyst device of the present disclosure, whereby a part of or all of oxygen stored by ceria in the exhaust gas purification catalyst device is released. As a result, in the exhaust gas purification catalyst device, the proportion of ceria in the oxygen released state (also referred to as $Ce_2O_3$ type ceria) is increased, and the oxygen storage amount in a lean atmosphere increases.

Furthermore, in this method, the amount, in particular, the total amount, of the oxygen reaction amount and the oxygen storage amount is measured by supplying a lean-atmosphere exhaust gas, particularly a lean-atmosphere exhaust gas with an oxygen concentration of 1 to 2%, to the first catalyst device.

In the case where the oxygen concentration of the lean atmosphere is high, consumption of oxygen, in particular, storage of oxygen, substantially completes in a short time. In this case, estimation of the oxygen consumption may not be performed accurately.

However, in the method of the present disclosure, the oxygen concentration of the lean atmosphere is in the above-described low value range, and therefore oxygen is consumed over a long time in the exhaust gas purification catalyst device. As a result, oxygen is sufficiently stored and sufficiently reacted, then oxygen flows out from the exhaust gas purification catalyst device, and this oxygen is detected.

Consequently, estimation of the oxygen consumption can be performed more accurately.

Based on these facts, even when the difference value in the oxygen consumption of the catalyst device between before and after deterioration thereof is small, estimation of the oxygen consumption can be performed more accurately. For this reason, with respect to the exhaust gas purification catalyst device of the present disclosure in which the amount of ceria as an OSC material is relatively small, the method of the present disclosure can be suitably applied.

In the method of the present disclosure, the air-fuel ratio of the lean atmosphere may be, for example, 14.8 or more, 14.9 or more, or 15.0 or more, and may be 15.3 or less, 15.2 or less, or 15.1 or less. Within this range, a problem, for example, a problem that oxygen stored in the first catalyst is excessively consumed by a reducing agent, etc., can be avoided.

Optional Feature 1 of Method of the Present Disclosure (Increase in Oxygen Reaction Amount in Lean Atmosphere)

In the second catalyst layer of the exhaust gas purification catalyst device of the present disclosure, optionally, a part of or all of Pd particles is supported on ceria having a fluorite-type structure. In this case, as described above, oxidative activity for HC, CO, etc., can be enhanced. Consequently, the oxygen consumption, in particular, the oxygen reaction amount, increases in a lean atmosphere.

(Increase in Oxygen Storage Amount in Lean Atmosphere)

In the method of the present disclosure employing this configuration, the rich atmosphere may be set to be relatively strong. For example, the air-fuel ratio of the rich atmosphere may be 12.0 or more, 12.3 or more, or 12.5 or more, and may be 13.0 or less, 12.8 or less, or 12.6 or less. In this case, due to the relatively strong rich atmosphere, ceria in the oxygen stored state can be sufficiently converted to ceria in the oxygen released state.

Furthermore, as described above, ceria, in particular, ceria having a fluorite-type structure, has OSC properties. The OSC properties are prominently exerted in ceria supporting a catalyst metal such as Pd. In other words, ceria supporting Pd has high OSC properties.

Accordingly, in the method of the present disclosure, when a rich-atmosphere exhaust gas is supplied to an exhaust gas purification catalyst device having such a configuration, most of oxygen stored by ceria in the exhaust gas purification catalyst device can be rapidly released.

As a result, the proportion of ceria in the oxygen released state can be increased in a rich atmosphere, and the oxygen storage amount of ceria can be enhanced in a lean atmosphere. Consequently, in a lean atmosphere, the oxygen consumption, in particular, the oxygen storage amount, increases.

Based on these facts, estimation of the oxygen consumption in the method of the present disclosure can be performed more accurately.

Optional Feature 2 of Method of the Present Disclosure (Increase in Oxygen Storage Amount in Lean Atmosphere)

In the case where the second catalyst layer of the exhaust gas purification catalyst device of the present disclosure optionally further contains alumina and a part of or all of Pd particles is supported on alumina, as described above, in a rich atmosphere, high-boiling-point HC in an exhaust gas can be decomposed to convert the high-boiling-point HC to low-boiling-point HC, CO, and $H_2$ each having a relatively high reduction performance (reduction performance: high-boiling-point HC<low-boiling-point HC<CO<$H_2$). Accordingly, in a rich atmosphere, CO, $H_2$, etc., rapidly react with oxygen in ceria to increase the proportion of ceria in the oxygen released state, whereby the oxygen storage amount of ceria can be enhanced in a lean atmosphere.

In the method of the present disclosure employing this configurations, the rich atmosphere may set to be relatively weak. For example, the air-fuel ratio of the rich atmosphere may be 13.2 or more, 13.5 or more, or 13.7 or more, and may be 14.2 or less, 14.0 or less, or 13.8 or less. In this case, even in a relatively slightly rich atmosphere, due to CO, $H_2$, etc., produced through decomposition of high-boiling-point HC by Pd supported on alumina, ceria in the oxygen storing state can be converted to ceria in the oxygen released state.

More specifically, in the method of the present disclosure employing this configuration, since the rich atmosphere may set to be relatively weak, the fuel economy at the time of detection of deterioration of an exhaust gas purification catalyst device can be improved.

FIG. 1 is a schematic diagram illustrating the relationship between the air-fuel ratio (A/F) of an exhaust gas discharged from an engine and the time, regarding the method of the present disclosure for detecting deterioration of an exhaust gas purification catalyst device. In FIG. 1, the dotted line of 14.7 indicates the theoretical air-fuel; the dotted line of lean indicates the air-fuel ratio at the time of normal running; the dotted line of rich indicates the air-fuel ratio at the time of normal running or deterioration detection; and the dotted line of slightly lean indicates the air-fuel ratio at the time of deterioration detection. In particular, the dotted line of rich is present, for example, in the range of 12.5 to 13.7, and the dotted line of slightly lean is present, for example, in the range of air-fuel ratio with an oxygen concentration of 1 to 2%.

Figure 2:
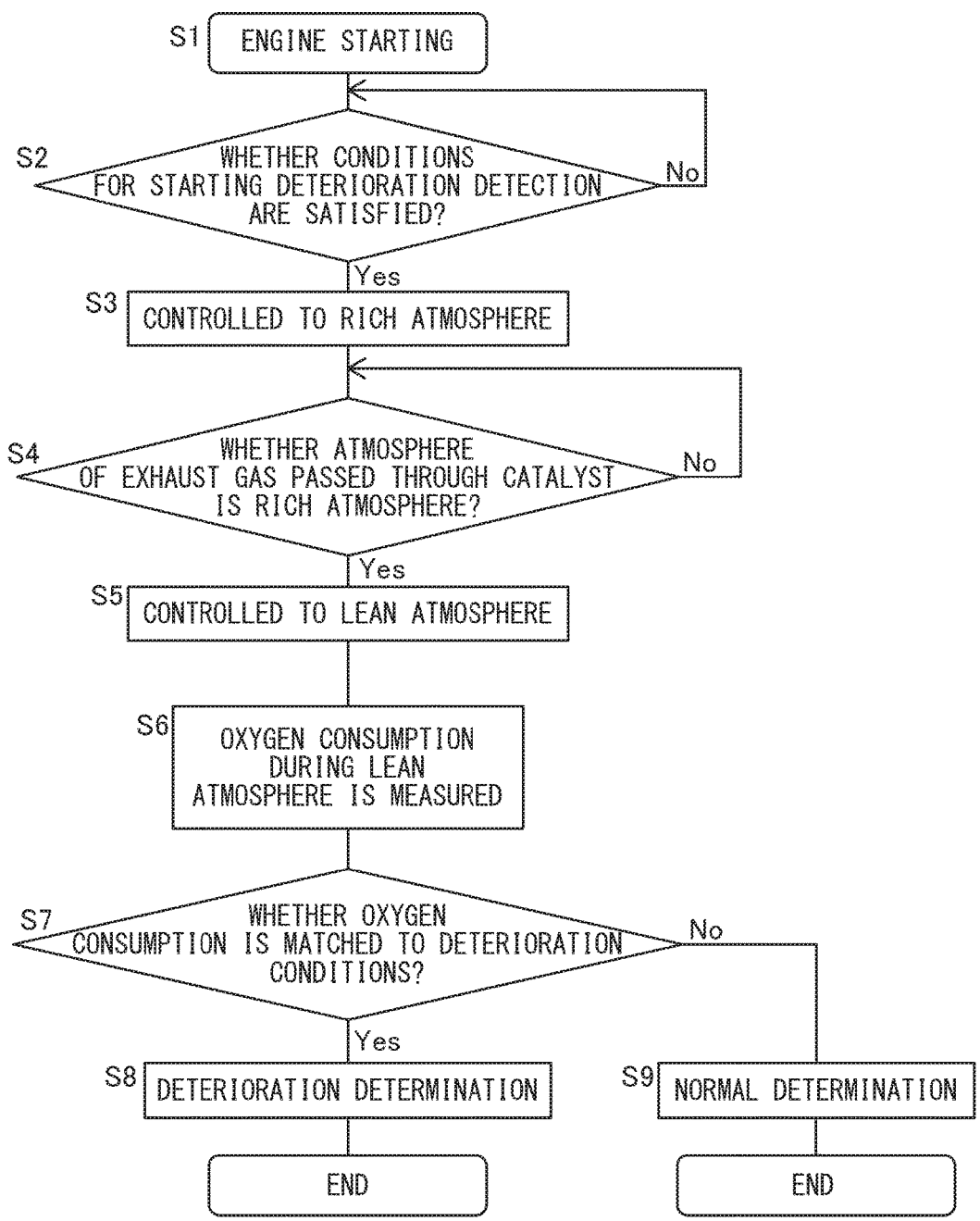
FIG. 2 is a chart diagram illustrating one embodiment of the method of the present disclosure for detecting deterioration of an exhaust gas purification catalyst device.

FIG. 2 is a chart diagram illustrating one embodiment of the method of the present disclosure for detecting deterioration of an exhaust gas purification catalyst device.

First, an engine is started (S1). Then, whether the conditions for starting deterioration detection are satisfied is determined (S2). When the conditions for starting deterioration detection are satisfied, the air-fuel ratio of the exhaust gas is controlled to a rich atmosphere (S3). Subsequently, whether the atmosphere of the exhaust gas passed through an exhaust gas purification catalyst device becomes a rich atmosphere (air-fuel ratio is 14.7 or less) is determined (S4). When the atmosphere of this exhaust gas becomes a rich atmosphere, the air-fuel ratio of the exhaust gas is controlled to a lean atmosphere (oxygen concentration is from 1 to 2%) (S5). The amount of oxygen consumed while the lean-atmosphere exhaust gas is being supplied is measured (S6). Whether the oxygen consumption complies with the deterioration conditions of an exhaust gas purification catalyst device is determined (S7). Then, whether the exhaust gas purification catalyst is deteriorated (S8) or is normally worked (S9) is determined.

With respect to the method of the present disclosure for detecting deterioration of an exhaust gas purification catalyst device, the description of the exhaust gas purification catalyst device of the present disclosure, the description of the production method of the exhaust gas purification catalyst device, and the description of the exhaust gas purification system of the present disclosure may be referred to.

The present disclosure is described in greater detail below by referring to Examples, but the scope of the present disclosure is of course not limited to these Examples.

EXAMPLES

Note

In the following, the production method of the exhaust gas purification catalyst device of each Example is described, but it should be understood that the amount of a material used in the production method, for example, the amount of a material such as "alumina composite powder", is an amount which can achieve the amount of "alumina composite oxide", etc., shown in the Table describing the configuration of the exhaust gas purification device (Table should be referred to in each Example).

In the Table of each Example, the unit "g/L" refers to the mass (g) of the material supported on per 1 L volume of the substrate. For example, when "Alumina composite oxide 16.5 (g/L)" is displayed in the Table, this expression means that 16.5 g of an alumina composite oxide is supported on per 1 L volume of the substrate.

The "upstream end" refers to an inlet portion which an exhaust gas to be passing through a honeycomb substrate enters into of the honeycomb substrate, and the "downstream end" mans an outlet portion which the exhaust gas exits from of the honeycomb substrate.

Examples A1 to A3: Study on Combination of Catalyst Metals

With respect to an exhaust gas purification catalyst device including a substrate, a first catalyst layer formed on a surface of the substrate, and a second catalyst layer formed on a surface of the first catalyst layer, the combination of catalyst metals contained in respective layers of the exhaust gas purification catalyst device of each Example was studied by measuring the HC purification ratio (%) in a lean atmosphere.

Production of Exhaust Gas Purification Catalyst Device of Example A1
(Preparation and Application of First Catalyst Layer Slurry)

A Pd nitrate solution containing Pd was added to an alumina composite powder ($La_2O_3$: 1 wt %, $Al_2O_3$: 99 wt %), and the mixture was stirred over 1 hour, dried at 120° C. over 30 minutes, and calcined at 500° C. over 2 hours to prepare a Pd-supported powder.

A Pt nitrate solution containing Pt was added to an alumina composite powder ($La_2O_3$: 1 wt %, $Al_2O_3$: 99 wt %), and the mixture was stirred over 1 hour, dried at 120° C. over 30 minutes, and calcined at 500° C. over 2 hours to prepare a Pt-supported powder.

A ceria-zirconia composite powder ($CeO_2$: 30 wt %, $ZrO_2$: 60 wt %, $La_2O_3$: 5 wt %, $Y_2O_3$: 5 wt %), a ceria-zirconia composite powder having a pyrochlore-type structure ($CeO_2$: 54.3 wt %, $ZrO_2$: 45.7 wt %), an alumina composite powder ($La_2O_3$: 4 wt %, $Al_2O_3$: 96 wt %), a barium sulfate powder as a sintering inhibitor, an alumina binder as a binder, and ion-exchanged water as a solvent were mixed with the above-prepared Pd-supported powder and Pt-supported powder to obtain a first catalyst layer slurry.

By using the first catalyst layer slurry, a washcoat was applied to a length of 90% of the whole length of a cordierite-made honeycomb substrate (0.875 L, 600 cells, 3 mil), from the upstream end toward the downstream end thereof, to form a first catalyst layer slurry layer.
(Drying, Etc., of First Catalyst Layer Slurry Layer)

The slurry layer was dried and calcined to form a first catalyst layer.
(Preparation and Application of Second Catalyst Layer Slurry 1: 22% of Whole Length from Upstream End)

A Pd nitrate solution containing Pd was added to an alumina composite powder ($La_2O_3$: 4 wt %, $Al_2O_3$: 96 wt %), and the mixture was stirred over 1 hour, dried at 120° C. over 30 minutes, and calcined at 500° C. over 2 hours to prepare a Pd-supported powder.

A ceria-zirconia composite powder ($CeO_2$: 60 wt %, $ZrO_2$: 30 wt %, $La_2O_3$: 3 wt %, $Pr_6O_{11}$: 7 wt %), a barium sulfate powder as a sintering inhibitor, an alumina binder as a binder, and ion-exchanged water as a solvent were mixed with the above-prepared Pd-supported powder to obtain a second catalyst layer slurry 1.

A washcoat was applied to a length of 22% (also referred to as "upstream-side coat ratio") of the whole length of the honeycomb substrate above, from the upstream end toward the downstream end thereof, to form a second catalyst layer slurry 1 layer.
(Drying, Etc., of Second Catalyst Layer Slurry 1 Layer)

The slurry layer was dried and calcined to form a second catalyst layer 1.
(Preparation and Application of Second Catalyst Layer Slurry 2: 80% of Whole Length from Downstream End)

A Rh nitrate solution containing Rh was added to a ceria-zirconia composite powder ($CeO_2$: 20 wt %, $ZrO_2$: 44 wt %, $La_2O_3$: 2 wt %, $Nd_2O_3$: 2 wt %, $Al_2O_3$: 30 wt %, $Y_2O_3$: 2 wt %), and the mixture was stirred over 1 hour, dried at 120° C. over 30 minutes, and calcined at 500° C. over 2 hours to prepare a Rh-supported powder.

An alumina composite powder ($La_2O_3$: 1 wt %, $Al_2O_3$: 99 wt %), an alumina binder as a binder, and ion-exchanged water as a solvent were mixed with the above-prepared Rh-supported powder to obtain a second catalyst layer slurry 2.

By using the second catalyst layer slurry 2, a washcoat was applied to a length of 80% (also referred to as "downstream-side coat ratio") of the whole length of the honeycomb substrate above, from the downstream end toward the upstream end thereof, to form a second catalyst layer slurry 2 layer.
(Drying, Etc., of Second Catalyst Layer Slurry 2 Layer)

The slurry layer was dried and calcined to form a second catalyst layer 2. By carrying out these steps, the exhaust gas purification catalyst device of Example A1 was obtained.
Production of Exhaust Gas Purification Catalyst Devices of Examples A2 and A3

The exhaust gas purification catalyst devices of Examples A2 and A3 were prepared in the same manner as the exhaust gas purification catalyst device of Example A1 other than, in the production of the exhaust gas purification catalyst device of Example A1, Pt as a catalyst metal being omitted and the amount of Pd was changed in the first catalyst layer slurry; and Pd as a catalyst metal was further employed in the second catalyst layer slurry of Example A3.

The configuration of the exhaust gas purification catalyst device of Example A1 is shown in Table 1 below, and the arrangement of catalyst metals constituting the exhaust gas purification catalyst device of each of Examples A1 to A3 and the amounts thereof are shown in Table 2 below.

TABLE 1

| Example A1 | Second catalyst layer (22% of whole length from upstream end) | Catalyst metal and support 1 | Alumina composite oxide 16.5 (g/L) | Pd (g/L) | 0.506 |
| | | | | Aluminum oxide (g/L) | 15.840 |
| | | | | Lanthanum oxide (g/L) | 0.660 |
| | | Support 2 | Ceria-zirconia composite oxide (fluorite-type structure) 4.4 (g/L) | Cerium oxide (g/L) | 2.640 |
| | | | | Zirconium oxide (g/L) | 1.320 |
| | | | | Lanthanum oxide (g/L) | 0.132 |
| | | | | Praseodymium oxide (g/L) | 0.308 |
| | | Sintering inhibitor | | Barium sulfate (g/L) | 2.000 |
| | | Binder | | Alumina binder (g/L) | 0.660 |
| | Second catalyst layer (80% of whole length from downstream end) | Catalyst metal and support 1 | Ceria-zirconia composite oxide (fluorite-type structure) 20.8 (g/L) | Rh (g/L) | 0.240 |
| | | | | Cerium oxide (g/L) | 4.160 |
| | | | | Zirconium oxide (g/L) | 9.152 |
| | | | | Lanthanum oxide (g/L) | 0.416 |
| | | | | Neodymium oxide (g/L) | 0.416 |
| | | | | Aluminum oxide (g/L) | 6.240 |
| | | | | Yttrium oxide (g/L) | 0.416 |
| | | Support 2 | Alumina composite oxide 51.2 (g/L) | Aluminum oxide (g/L) | 50.688 |
| | | | | Lanthanum oxide (g/L) | 0.512 |
| | | Binder | | Alumina binder (g/L) | 2.400 |
| | First catalyst layer (90% of | Catalyst metal and support 1 | Alumina composite oxide 25.35 (g/L) | Pd (g/L) | 0.540 |
| | | | | Aluminum oxide (g/L) | 25.097 |
| | | | | Lanthanum oxide (g/L) | 0.254 |

TABLE 1-continued

| | | | | |
|---|---|---|---|---|
| whole length from upstream end) | Catalyst metal and support 2 | Alumina composite oxide 25.35 (g/L) | Pt (g/L) Aluminum oxide (g/L) Lanthanum oxide (g/L) | 0.540 25.097 0.254 |
| | Support 3 | Ceria-zirconia composite oxide (fluorite-type structure) 25.2 (g/L) | Cerium oxide (g/L) Zirconium oxide (g/L) Lanthanum oxide (g/L) Yttrium oxide (g/L) | 7.560 15.120 1.260 1.260 |
| | Support 4 | Ceria-zirconia composite oxide (pyrochlore-type structure) 9.0 (g/L) | Cerium oxide (g/L) Zirconium oxide (g/L) | 4.887 4.113 |
| | Support 5 | Alumina composite oxide 27.0 (g/L) | Aluminum oxide (g/L) Lanthanum oxide (g/L) | 25.920 1.080 |
| | Sintering inhibitor | Barium sulfate (g/L) | | 13.500 |
| | Binder | Alumina binder (g/L) | | 2.700 |
| Substrate (whole length) | Cordierite-made honeycomb 0.875 L, 600 cells, and 3 mil | | | |

In Table 1, the "whole length" refers to the whole length of the honeycomb substrate.

TABLE 2

| | First Catalyst Layer (lower layer) | | Second Catalyst Layer (upper layer: 22% of whole length from upstream end) | | Second Catalyst Layer (upper layer: 80% of whole length from downstream end) | |
|---|---|---|---|---|---|---|
| | Catalyst Metal | Content (g/L) | Catalyst Metal | Content (g/L) | Catalyst Metal | Content (g/L) |
| Example A1 | Pt and Pd | 0.540 and 0.540 | Pd | 0.506 | Rh | 0.240 |
| Example A2 | Pd | 1.080 | Pd | 0.506 | Rh | 0.240 |
| Example A3 | Pd | 0.760 | Pd | 0.506 | Rh and Pd | 0.240 and 0.320 |

Evaluation

The exhaust gas purification catalyst devices of Examples A1 to A3 were subjected to a durability test and thereafter, these catalysts were evaluated for the HC purification ratio (%) in a lean atmosphere.

(Durability Test)

The durability test was performed by attaching the exhaust gas purification catalyst device of each of Examples A1 to A3 to an exhaust system of a V-8 cylinder engine, flowing an exhaust gas of each of rich, stoichiometric, and lean atmospheres for a predetermined time at a catalyst floor temperature of 950° C. over 50 hours, which was taken as one cycle, and repeating the cycle.

(Evaluation of HC Purification Ratio)

After the durability test, the exhaust gas purification catalyst device was connected to downstream on the exhaust side of a 2 L lean burn engine, the engine was started, and the HC purification ratio in the exhaust gas was measured by means of Horiba MEXA 7500D. The temperature (° C.) of the catalyst, the rotation speed (rpm) of the engine, the torque (Nm), the intake air amount (g/s), and the air-fuel ratio (A/F) are shown in Table 3, and the results are depicted in FIG. 3.

TABLE 3

| Condition No. | Temperature of Catalyst (° C.) | Rotation Speed of Engine (rpm) | Torque (Nm) | Intake Air Amount (g/s) | Air-Fuel Ratio (A/F) |
|---|---|---|---|---|---|
| 1 | 400 | 1285 | 51 | 15 | 25 |
| 2 | 435 | 1686 | 66 | 23 | 25 |
| 3 | 480 | 2108 | 85 | 36 | 25 |
| 4 | 520 | 2530 | 108 | 51 | 25 |

Figure 3:
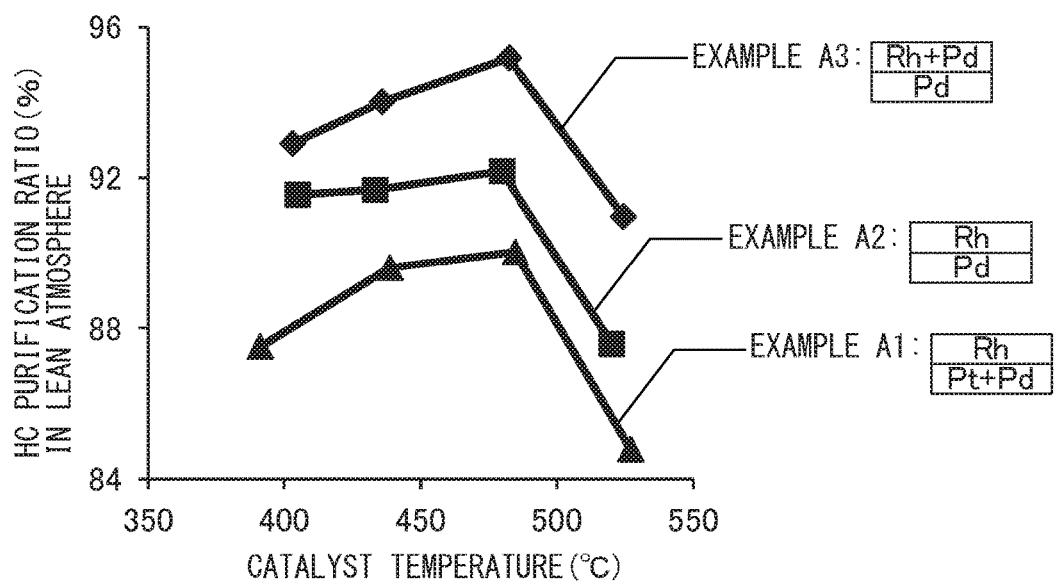
FIG. 3 is a diagram illustrating the relationship between the temperature (° C.) of the catalyst and the HC purification ratio (%) in a lean atmosphere, regarding the exhaust gas purification catalyst devices of Examples A1 to A3.

FIG. 3 is a diagram illustrating the relationship between the temperature (° C.) of the catalyst and the HC purification ratio (%) in a lean atmosphere, regarding the exhaust gas purification catalyst devices of Examples A1 to A3.

It is seen from FIG. 3 that comparing the exhaust gas purification catalyst devices of Example A1 (with Pt in the first catalyst layer) and Example A2 (with no Pt in the first catalyst layer), the exhaust gas purification device of Example A2 achieved a higher HC purification ratio at each of the catalyst temperatures (400° C., 435° C., 480° C., and 520° C.)

It is also seen from FIG. 3 that comparing each of temperatures (400° C., 435° C., 480° C., and 520° C.) of the exhaust gas purification devices of Example A2 (in the second catalyst layer, with no Pd in 80% of the whole length from the downstream end) and Example A3 (in the second catalyst layer, with Pd in 80% of the whole length from the downstream end), the exhaust gas purification catalyst device of Example A3 achieved a higher HC purification ratio. It is believed that that Pd contained in the second catalyst layer of Example A3 has a high ability to catalyze a HC oxidation reaction and, since Pd is coated to 80% of the whole length from the downstream end of the substrate, the contact frequency between Pd and the exhaust gas is enhanced.

Examples B1 to B7: Study on Amount of Pd Contained in Second Catalyst Layer

With respect to an exhaust gas purification catalyst device including a substrate, a first catalyst layer formed on a surface of the substrate, and a second catalyst layer formed on a surface of the first catalyst layer, wherein the first catalyst layer contains Pd and the second catalyst layer contains Pd and Rh, the amount of Pd contained in the second catalyst layer was studied by measuring the HC purification ratio (%) in a lean atmosphere and the NOx purification ratio (%) in a rich atmosphere.

Production of Exhaust Gas Purification Catalyst Device of Example B2
(Preparation and Application of First Catalyst Layer Slurry)

A Pd nitrate solution containing Pd was added to an alumina composite powder ($La_2O_3$: 1 wt %, $Al_2O_3$: 99 wt %), and the mixture was stirred over 1 hour, dried at 120° C. over 30 minutes, and calcined at 500° C. over 2 hours to prepare a Pd-supported powder.

A ceria-zirconia composite powder ($CeO_2$: 30 wt %, $ZrO_2$: 60 wt %, $La_2O_3$: 5 wt %, $Y_2O_3$: 5 wt %), a ceria-zirconia composite powder having a pyrochlore-type structure ($CeO_2$: 54.3 wt %, $ZrO_2$: 45.7 wt %), an alumina composite powder ($La_2O_3$: 4 wt %, $Al_2O_3$: 96 wt %), a barium sulfate powder as a sintering inhibitor, an alumina binder as a binder, and ion-exchanged water as a solvent were mixed with the above-prepared Pd-supported powder to obtain a first catalyst layer slurry.

By using the first catalyst layer slurry, a washcoat was applied to a length of 90% of the whole length of a cordierite-made honeycomb substrate (0.875 L, 600 cells, 3 mil), from the upstream end toward the downstream end thereof, to form a first catalyst layer slurry layer.
(Drying, Etc., of First Catalyst Layer Slurry Layer)

The slurry layer was dried and calcined to form a first catalyst layer.
(Preparation and Application of Second Catalyst Layer Slurry)

A Rh nitrate solution containing Rh was added to a zirconia composite oxide ($ZrO_2$: 64 wt %, $La_2O_3$: 2 wt %, $Nd_2O_3$: 2 wt %, $Al_2O_3$: 30 wt %, $Y_2O_3$: 2 wt %), and the mixture was stirred over 1 hour, dried at 120° C. over 30 minutes, and calcined at 500° C. over 2 hours to prepare a Rh-supported powder.

A Pd nitrate solution containing Pd was added to a ceria-zirconia composite powder ($CeO_2$: 30 wt %, $ZrO_2$: 60 wt %, $La_2O_3$: 5 wt %, $Y_2O_3$: 5 wt %), and the mixture was stirred over 1 hour, dried at 120° C. over 30 minutes, and calcined at 500° C. over 2 hours to prepare a Pd-supported powder.

An alumina composite powder ($La_2O_3$: 1 wt %, $Al_2O_3$: 99 wt %), an alumina binder as a binder, and ion-exchanged water as a solvent were mixed with the above-prepared Rh-supported powder and Pd-supported powder to obtain a second catalyst layer slurry.

By using the second catalyst layer slurry, a washcoat was applied to a length of 100% of the whole length from the downstream end toward the upstream end of the honeycomb substrate above to form a second catalyst layer slurry layer.
(Drying, Etc., of Second Catalyst Layer Slurry Layer)

The slurry layer was dried and calcined to form a second catalyst layer 1. By carrying out these steps, the exhaust gas purification catalyst device of Example B2 was obtained.

Production of Exhaust Gas Purification Catalyst Devices of Examples B1 and B3 to B7

The exhaust gas purification catalyst devices of Examples B1 and B3 to B7 were prepared in the same manner as the exhaust gas purification catalyst device of Example B2 other than, in the production of the exhaust gas purification catalyst device of Example B2, the amount of Pd contained in the first and second catalyst layers being changed and the amount of Rh contained in the second catalyst layer was changed in Examples B6 and B7.

The configuration of the exhaust gas purification catalyst device of Example B2 is shown in Table 4 below, and the arrangement of catalyst metals constituting the exhaust gas purification catalyst device of each of Examples B1 to B7 and the amounts thereof are shown in Table 5 below.

TABLE 4

| Example | | | | | |
|---|---|---|---|---|---|
| B2 | Second catalyst layer (100% of whole length from upstream) | Catalyst metal and support 1 | Ceria-zirconia composite oxide (fluorite-type structure) 16.0 (g/L) | Pd (g/L) | 0.080 |
| | | | | Cerium oxide (g/L) | 4.800 |
| | | | | Zirconium oxide (g/L) | 9.600 |
| | | | | Lanthanum oxide (g/L) | 0.800 |
| | | | | Yttrium oxide (g/L) | 0.800 |
| | | Catalyst metal and support 2 | Zirconia composite oxide 57.6 (g/L) | Rh (g/L) | 0.240 |
| | | | | Zirconium oxide (g/L) | 36.864 |
| | | | | Lanthanum oxide (g/L) | 1.152 |
| | | | | Neodymium oxide (g/L) | 1.152 |
| | | | | Aluminum oxide (g/L) | 17.280 |
| | | | | Yttrium oxide (g/L) | 1.152 |
| | | Support 3 | Alumina composite oxide 30.4 (g/L) | Aluminum oxide (g/L) | 30.096 |
| | | | | Lanthanum oxide (g/L) | 0.304 |
| | | Binder | Alumina binder (g/L) | | 2.400 |
| | First catalyst layer (90% of whole length from upstream) | Catalyst metal and support 1 | Alumina composite oxide 45.0 (g/L) | Pd (g/L) | 1.500 |
| | | | | Aluminum oxide (g/L) | 44.550 |
| | | | | Lanthanum oxide (g/L) | 0.450 |
| | | Support 2 | Ceria-zirconia composite oxide (fluorite-type structure) 31.5 (g/L) | Cerium oxide (g/L) | 9.450 |
| | | | | Zirconium oxide (g/L) | 18.900 |
| | | | | Lanthanum oxide (g/L) | 1.575 |
| | | | | Yttrium oxide (g/L) | 1.575 |
| | | Support 3 | Ceria-zirconia composite oxide (pyrochlore-type structure) 9.0 (g/L) | Cerium oxide (g/L) | 4.887 |
| | | | | Zirconium oxide (g/L) | 4.113 |

TABLE 4-continued

| | | | |
|---|---|---|---|
| | Support 4 | Alumina composite Aluminum oxide (g/L) | 17.280 |
| | | oxide 18.0 (g/L) Lanthanum oxide (g/L) | 0.720 |
| | Sintering inhibitor | Barium sulfate (g/L) | 13.500 |
| | Binder | Alumina binder (g/L) | 2.700 |
| Substrate (whole length) | | Cordierite-made honeycomb 0.875 L, 600 cell, and 3 mill | |

TABLE 5

| | First Catalyst Layer (lower layer) | | Second Catalyst Layer (upper layer) | | | Total Pd |
|---|---|---|---|---|---|---|
| | Catalyst Metal | Content (g/L) | Catalyst Metal | Content (g/L) | Pd/Rh | Amount (g/L) |
| Example B1 | Pd | 1.58 | Pd and Rh | 0.00 and 0.24 | 0.00 | 1.58 |
| Example B2 | Pd | 1.50 | Pd and Rh | 0.08 and 0.24 | 0.33 | 1.58 |
| Example B3 | Pd | 1.26 | Pd and Rh | 0.32 and 0.24 | 1.33 | 1.58 |
| Example B4 | Pd | 1.07 | Pd and Rh | 0.51 and 0.24 | 2.13 | 1.58 |
| Example B5 | Pd | 0.94 | Pd and Rh | 0.64 and 0.24 | 2.67 | 1.58 |
| Example B6 | Pd | 0.94 | Pd and Rh | 0.64 and 0.08 | 8.00 | 1.58 |
| Example B7 | Pd | 1.07 | Pd and Rh | 0.51 and 0.04 | 12.75 | 1.58 |

Evaluation

The exhaust gas purification catalyst devices of Examples B1 to B7 were subjected to a durability test and thereafter, these catalysts were evaluated for the HC purification ratio (%) in a lean atmosphere and the NOx purification ratio (%) in a rich atmosphere.

(Durability Test)

The durability test was the same as the durability test performed in Examples A1 to A3.

(Evaluation of HC Purification Ratio)

After the durability test, the HC purification ratio was evaluated. The conditions in evaluation of the HC purification ratio were the same as those in evaluation performed in Examples A1 to A3, and Condition No. 4 in Table 3 was employed. The results are depicted in FIG. 4.

Figure 4:
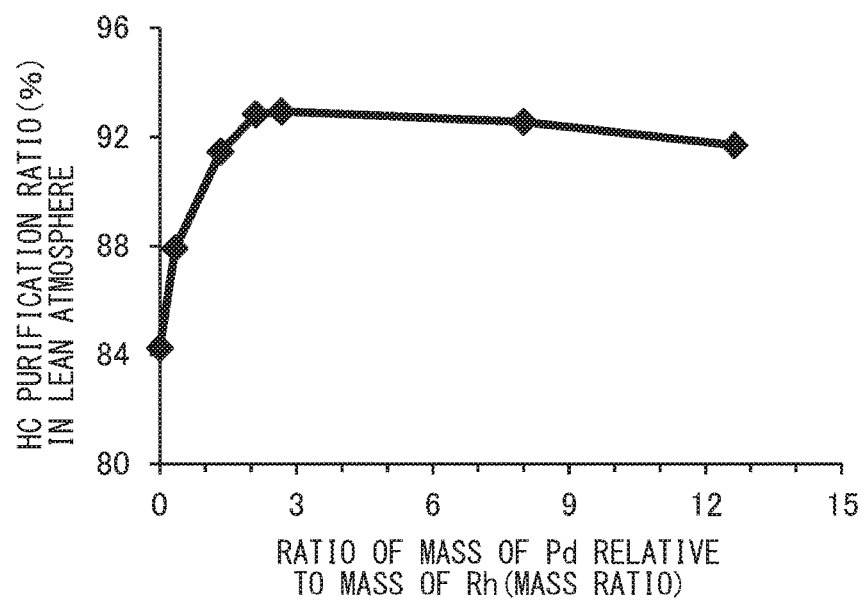
FIG. 4 is a diagram illustrating the relationship between the ratio of the mass of Pd relative to the mass of Rh (mass ratio) in Pd and Rh contained in the second catalyst layer and the HC purification ratio (%) in a lean atmosphere, regarding the exhaust gas purification catalyst devices of Examples B1 to B7.

FIG. 4 is a diagram illustrating the relationship between the ratio of the mass of Pd relative to the mass of Rh (mass ratio) in Pd and Rh contained in the second catalyst layer and the HC purification ratio (%) in a lean atmosphere, regarding the exhaust gas purification catalyst devices of Examples B1 to B7. In FIG. 4, the dots, starting from the left, indicate Examples B1 to B7, respectively.

It is seen from FIG. 4 that compared with the exhaust gas purification catalyst devices of Example B1 not containing Pd in the second catalyst layer (upper layer), the exhaust gas purification device of Examples B2 to B7, in particular, of Examples B3 to B7, achieved a high HC purification ratio. More specifically, it is understood that, when the content of Pd contained in the second catalyst layer (upper layer) is from 0.08 to 0.64 g/L, in particular, from 0.32 to 0.64 g/L, a high HC purification ratio was achieved.

(NOx Purification Ratio in Rich Atmosphere)

The exhaust gas purification catalyst device was connected to downstream on the exhaust side of a 2 L lean burn engine, the engine was started, and the NOx purification ratio in the exhaust gas was measured by means of Horiba MEXA 7500D. The temperature (° C.) of the catalyst was 550° C., the rotation speed (rpm) of the engine was 3,000 rpm, and the air-fuel ratio (A/F) was 14.2. The results are depicted in FIG. 5.

Figure 5:
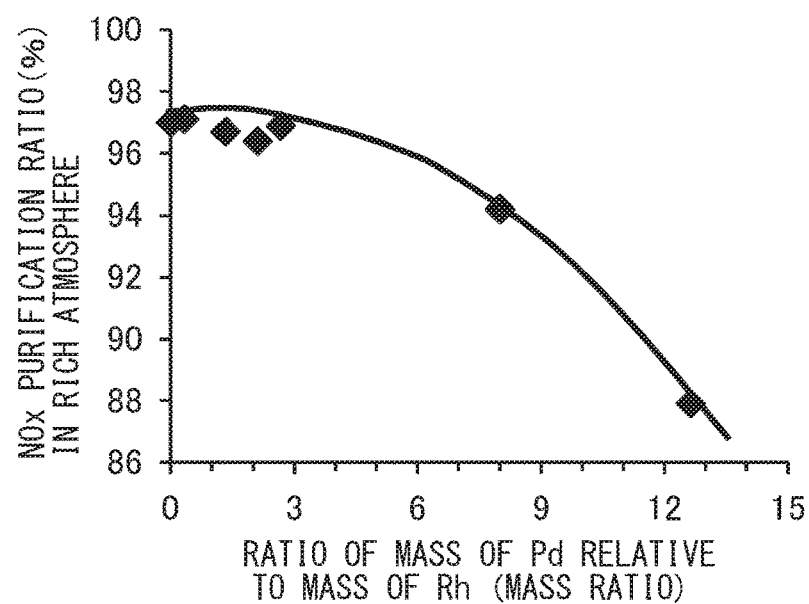
FIG. 5 is a diagram illustrating the relationship between the ratio of the mass of Pd relative to the mass of Rh (mass ratio) and the NOx purification ratio (%) in a rich atmosphere, regarding Pd and Rh contained in the second catalyst layer of the exhaust gas purification catalyst devices of Examples B1 to B7.

FIG. 5 is a diagram illustrating the relationship between the ratio of the mass of Pd relative to the mass of Rh (mass ratio) in Pd and Rh contained in the second catalyst layer and the NOx purification ratio (%) in a rich atmosphere, regarding the exhaust gas purification catalyst devices of Examples B1 to B7. In FIG. 5, the dots, starting from the left, indicate Examples B1 to B7, respectively.

It is understood from FIG. 5 that, with respect to the exhaust gas purification catalyst devices of Examples B1 to B5, even when the content of Pd contained in the second catalyst layer was increased, the NOx purification ratio in a rich atmosphere was maintained at a high ratio or enhanced.

Furthermore, in Example B6 (Rh: 0.08 g/L) and Example B7 (Rh: 0.04 g/L) of FIG. 5, the NOx purification ratio in a rich atmosphere was about 94% and about 88%, respectively, and it is not believed that the NOx purifying performance of Rh was decreased by Pd, but that the percentage content of Rh contained in the second catalyst layer was low.

For example, with respect to the combination of Examples B4 and B7 and the combination of Examples B5 and B6, both combinations are the same in the content of Pd contained in the second catalyst layer but are different in the content of Rh. In relation to these combinations, the increase or decrease of the NOx purification ratio in a rich atmosphere is correlated to the increase or decrease in the content of Rh contained in the second catalyst layer.

Examples C1 to C3: Study on Overall Performance

With respect to an exhaust gas purification catalyst device including a substrate, a first catalyst layer formed on a surface of the substrate, and a second catalyst layer formed on a surface of the first catalyst layer, wherein the first catalyst layer contains Pd and the second catalyst layer contains Pd and Rh, the overall performance was studied.

Production of Exhaust Gas Purification Catalyst Device of Example C1: Supported Pd-Ceria Type The exhaust gas purification catalyst device of Example C1 was prepared in the same manner as the exhaust gas purification catalyst device of Example B2 other than, in the production of the exhaust gas purification catalyst device of Example B2, the amount of Pd contained in the first and second catalyst layers being changed. The configuration of the exhaust gas purification catalyst device of Example C1 is shown in Table 6 below.

(Preparation and Application of Second Catalyst Layer Slurry)

A Rh nitrate solution containing Rh was added to a zirconia composite oxide ($ZrO_2$: 64 wt %, $La_2O_3$: 2 wt %, $Nd_2O_3$: 2 wt %, $Al_2O_3$: 30 wt %, $Y_2O_3$: 2 wt %), and the

TABLE 6

| Example C1 | Second catalyst layer (100% of whole length from upstream) | Catalyst metal and support 1 | Ceria-zirconia composite oxide (fluorite-type structure) 16.0 (g/L) | Pd (g/L) | 0.506 |
|---|---|---|---|---|---|
| | | | | Cerium oxide (g/L) | 4.800 |
| | | | | Zirconium oxide (g/L) | 9.600 |
| | | | | Lanthanum oxide (g/L) | 0.800 |
| | | | | Yttrium oxide (g/L) | 0.800 |
| | | Catalyst metal and support 2 | Zirconia composite oxide 57.6 (g/L) | Rh (g/L) | 0.240 |
| | | | | Zirconium oxide (g/L) | 36.864 |
| | | | | Lanthanum oxide (g/L) | 1.152 |
| | | | | Neodymium oxide (g/L) | 1.152 |
| | | | | Aluminum oxide (g/L) | 17.280 |
| | | | | Yttrium oxide (g/L) | 1.152 |
| | | Support 3 | Alumina composite oxide 30.4 (g/L) | Aluminum oxide (g/L) | 30.096 |
| | | | | Lanthanum oxide (g/L) | 0.304 |
| | | Binder | | Alumina binder (g/L) | 2.400 |
| | First catalyst layer (90% of whole length from upstream) | Catalyst metal and support 1 | Alumina composite oxide 45.0 (g/L) | Pd (g/L) | 1.080 |
| | | | | Aluminum oxide (g/L) | 44.550 |
| | | | | Lanthanum oxide (g/L) | 0.450 |
| | | Support 2 | Ceria-zirconia composite oxide (fluorite-type structure) 31.5 (g/L) | Cerium oxide (g/L) | 9.450 |
| | | | | Zirconium oxide (g/L) | 18.900 |
| | | | | Lanthanum oxide (g/L) | 1.575 |
| | | | | Yttrium oxide (g/L) | 1.575 |
| | | Support 3 | Ceria-zirconia composite oxide (pyrochlore-type structure) 9.0 (g/L) | Cerium oxide (g/L) | 4.887 |
| | | | | Zirconium oxide (g/L) | 4.113 |
| | | Support 4 | Alumina composite oxide 18.0 (g/L) | Aluminum oxide (g/L) | 17.280 |
| | | | | Lanthanum oxide (g/L) | 0.720 |
| | | Sintering inhibitor | | Barium sulfate (g/L) | 13.500 |
| | | Binder | | Alumina binder (g/L) | 2.700 |
| | Substrate (whole length) | | Cordierite-made honeycomb 1.075 L, 600 cells, and 2.5 mil | | |

Production of Exhaust Gas Purification Catalyst Device of Example C2: Supported Pd-Alumina Type (Preparation and Application of First Catalyst Layer Slurry)

A Pd nitrate solution containing Pd was added to an alumina composite powder ($La_2O_3$: 1 wt %, $Al_2O_3$: 99 wt %), and the mixture was stirred over 1 hour, dried at 120° C. over 30 minutes, and calcined at 500° C. over 2 hours to prepare a Pd-supported powder.

A ceria-zirconia composite powder ($CeO_2$: 30 wt %, $ZrO_2$: 60 wt %, $La_2O_3$: 5 wt %, $Y_2O_3$: 5 wt %), a ceria-zirconia composite powder having a pyrochlore-type structure ($CeO_2$: 54.3 wt %, $ZrO_2$: 45.7 wt %), an alumina composite powder ($La_2O_3$: 4 wt %, $Al_2O_3$: 96 wt %), a barium sulfate powder as a sintering inhibitor, an alumina binder as a binder, and ion-exchanged water as a solvent were mixed with the above-prepared Pd-supported powder to obtain a first catalyst layer slurry.

By using the first catalyst layer slurry, a washcoat was applied to a length of 90% of the whole length of a cordierite-made honeycomb substrate (1.075 L, 600 cells, 2.5 mil), from the upstream end toward the downstream end thereof, to form a first catalyst layer slurry layer.

(Drying, Etc., of First Catalyst Layer Slurry Layer)

The slurry layer was dried and calcined to form a first catalyst layer.

mixture was stirred over 1 hour, dried at 120° C. over 30 minutes, and calcined at 500° C. over 2 hours to prepare a Rh-supported powder.

A Pd nitrate solution containing Pd was added to an alumina composite powder ($La_2O_3$: 1 wt %, $Al_2O_3$: 99 wt %), and the mixture was stirred over 1 hour, dried at 120° C. over 30 minutes, and calcined at 500° C. over 2 hours to prepare a Pd-supported powder.

A ceria-zirconia composite powder ($CeO_2$: 20 wt %, $ZrO_2$: 44 wt %, $La_2O_3$: 2 wt %, $Nd_2O_3$: 2 wt %, $Al_2O_3$: 30 wt %, $Y_2O_3$: 2 wt %), an alumina binder as a binder, and ion-exchanged water as a solvent were mixed with the above-prepared Rh-supported powder and Pd-supported powder to obtain a second catalyst layer slurry.

By using the second catalyst layer slurry, a washcoat was applied to a length of 100% of the whole length of the honeycomb substrate above, from the downstream end toward the upstream end thereof, to form a second catalyst layer slurry layer.

(Drying, Etc., of Second Catalyst Layer Slurry Layer)

The slurry layer was dried and calcined to form a second catalyst layer. By carrying out these steps, the exhaust gas purification catalyst device of Example C2 was obtained. The configuration of the exhaust gas purification catalyst device of Example C2 is shown in Table 7 below.

TABLE 7

| Example C2 | Second catalyst layer (100% of whole length from upstream) | Catalyst metal and support 1 | | Pd (g/L) | 0.506 |
|---|---|---|---|---|---|
| | | | Alumina composite oxide 46.4 (g/L) | Aluminum oxide (g/L) | 45.936 |
| | | | | Lanthanum oxide (g/L) | 0.464 |
| | | Catalyst metal and support 2 | | Rh (g/L) | 0.240 |
| | | | Zirconia composite oxide 38.4 (g/L) | Zirconium oxide (g/L) | 24.576 |
| | | | | Lanthanum oxide (g/L) | 0.768 |
| | | | | Neodymium oxide (g/L) | 0.768 |
| | | | | Aluminum oxide (g/L) | 11.520 |
| | | | | Yttrium oxide (g/L) | 0.768 |
| | | Support 3 | Ceria-zirconia composite oxide (cubic crystal structure and/or hexagonal crystal structure) 19.2 (g/L) | Cerium oxide (g/L) | 3.840 |
| | | | | Zirconium oxide (g/L) | 8.448 |
| | | | | Lanthanum oxide (g/L) | 0.384 |
| | | | | Neodymium oxide (g/L) | 0.384 |
| | | | | Aluminum oxide (g/L) | 5.760 |
| | | | | Yttrium oxide (g/L) | 0.384 |
| | | Binder | | Alumina binder (g/L) | 2.400 |
| | First catalyst layer (90% of whole length from upstream) | Catalyst metal and support 1 | | Pd (g/L) | 1.080 |
| | | | Alumina composite oxide 42.3 (g/L) | Aluminum oxide (g/L) | 41.877 |
| | | | | Lanthanum oxide (g/L) | 0.423 |
| | | Support 2 | Ceria-zirconia composite oxide (fluorite-type structure) 34.2 (g/L) | Cerium oxide (g/L) | 10.260 |
| | | | | Zirconium oxide (g/L) | 20.520 |
| | | | | Lanthanum oxide (g/L) | 1.710 |
| | | | | Yttrium oxide (g/L) | 1.710 |
| | | Support 3 | Ceria-zirconia composite oxide (pyrochlore-type structure) 9.0 (g/L) | Cerium oxide (g/L) | 4.887 |
| | | | | Zirconium oxide (g/L) | 4.113 |
| | | Support 4 | Alumina composite oxide 18.0 (g/L) | Aluminum oxide (g/L) | 17.280 |
| | | | | Lanthanum oxide (g/L) | 0.720 |
| | | Sintering inhibitor | | Barium sulfate (g/L) | 13.500 |
| | | Binder | | Alumina binder (g/L) | 2.700 |
| Substrate (whole length) | | | | Cordierite-made honeycomb 1.075 L, 600 cells, and 2.5 mil | |

Production of Exhaust Gas Purification Catalyst Device of Example C3: Second Catalyst Layer Separation Type The exhaust gas purification catalyst device of Example C3 was prepared in the same manner as the exhaust gas purification catalyst device of Example A1 other than, in the production of the exhaust gas purification catalyst device of Example A1, the step of manufacturing a Pt-supported powder being omitted at the time of preparation of a first catalyst layer slurry, the amount of Pd was changed in the step of manufacturing a Pd-supported powder, and the substrate was changed. The configuration of the exhaust gas purification catalyst device of Example C3 is shown in Table 8 below.

TABLE 8

| Example C3 | Second catalyst layer (22% of whole length from upstream) | Catalyst metal and support 1 | | Pd (g/L) | 0.506 |
|---|---|---|---|---|---|
| | | | Alumina composite oxide 16.5 (g/L) | Aluminum oxide (g/L) | 15.840 |
| | | | | Lanthanum oxide (g/L) | 0.660 |
| | | Support 2 | Ceria-zirconia composite oxide (fluorite-type structure) 4.4 (g/L) | Cerium oxide (g/L) | 2.640 |
| | | | | Zirconium oxide (g/L) | 1.320 |
| | | | | Lanthanum oxide (g/L) | 0.132 |
| | | | | Praseodymium oxide (g/L) | 0.308 |
| | | Support 3 | | Barium sulfate (g/L) | 2.000 |
| | | Binder | | Alumina binder (g/L) | 0.660 |
| | Second catalyst layer (80% of whole length from downstream) | Catalyst metal and support 1 | | Rh (g/L) | 0.240 |
| | | | Ceria-zirconia composite oxide (fluorite-type structure) 20.8 (g/L) | Cerium oxide (g/L) | 4.160 |
| | | | | Zirconium oxide (g/L) | 9.152 |
| | | | | Lanthanum oxide (g/L) | 0.416 |
| | | | | Neodymium oxide (g/L) | 0.416 |
| | | | | Aluminum oxide (g/L) | 6.240 |
| | | | | Yttrium oxide (g/L) | 0.416 |
| | | Support 2 | Alumina composite oxide 51.2 (g/L) | Aluminum oxide (g/L) | 50.688 |
| | | | | Lanthanum oxide (g/L) | 0.512 |
| | | Binder | | Alumina binder (g/L) | 2.400 |
| | First catalyst layer (90% of whole length from upstream) | Catalyst metal and support 1 | | Pd (g/L) | 1.080 |
| | | | Alumina composite oxide 50.7 (g/L) | Aluminum oxide (g/L) | 50.193 |
| | | | | Lanthanum oxide (g/L) | 0.507 |
| | | Support 2 | Ceria-zirconia composite oxide (fluorite-type structure) 25.2 (g/L) | Cerium oxide (g/L) | 7.560 |
| | | | | Zirconium oxide (g/L) | 15.120 |
| | | | | Lanthanum oxide (g/L) | 1.260 |
| | | | | Yttrium oxide (g/L) | 1.260 |
| | | Support 3 | Ceria-zirconia composite oxide (pyrochlore-type structure) 9.0 (g/L) | Cerium oxide (g/L) | 4.887 |
| | | | | Zirconium oxide (g/L) | 4.113 |

TABLE 8-continued

|  | Support 4 | Alumina composite oxide 27.0 (g/L) | Aluminum oxide (g/L) | 25.920 |
|---|---|---|---|---|
|  |  |  | Lanthanum oxide (g/L) | 1.080 |
|  | Sintering inhibitor |  | Barium sulfate (g/L) | 13.500 |
|  | Binder |  | Alumina binder (g/L) | 2.700 |
| Substrate (whole length) |  | Cordierite-made honeycomb 1.075 L, 600 cell, and 2.5 mil | | |

Figure 6:
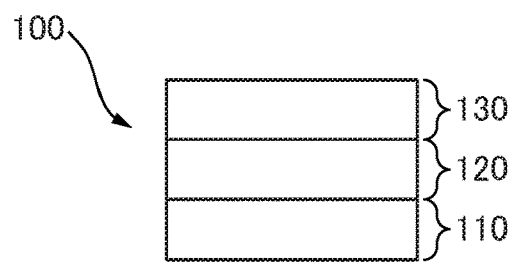
FIG. 6 is a schematic diagram of the exhaust gas purification catalyst devices of Examples C1 and C2.
Figure 7:
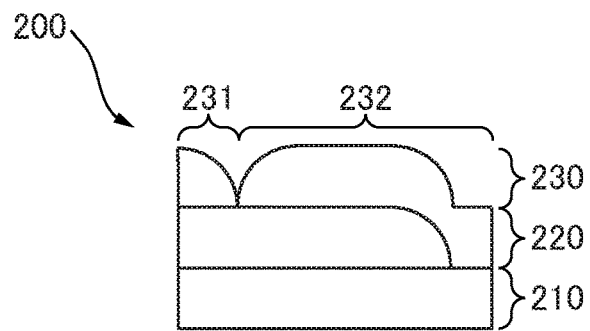
FIG. 7 is a schematic diagram of the exhaust gas purification catalyst device of Example C3.

A schematic view of the exhaust gas purification catalyst devices of Examples C1 and C2 is depicted in FIG. 6, and a schematic view of the exhaust gas purification catalyst device of Example C3 is depicted in FIG. 7.

FIG. 6 is a schematic diagram of the exhaust gas purification catalyst devices of Examples C1 and C2. The exhaust gas purification catalyst device 100 of FIG. 6 includes a substrate 110, a first catalyst layer 120 containing Pd and formed on a surface of the substrate 110, and a second catalyst layer 130 formed on a surface of the first catalyst layer 120. In this exhaust gas purification catalyst device 100, in the second catalyst layer, ceria, Pd, and Rh are contained in a mixed state in the same layer.

FIG. 7 is a schematic diagram of the exhaust gas purification catalyst device of Example C3. The exhaust gas purification catalyst device 200 of FIG. 7 includes a substrate 210, a first catalyst layer 220 containing Pd and formed on a surface of the substrate 210, and a second catalyst layer 230 formed on a surface of the first catalyst layer 220. In this exhaust gas purification catalyst device 200, the second catalyst layer 230 is divided into an upstream part 231 containing Pd and a downstream part 232 containing Rh.

Evaluation

The exhaust gas purification catalyst devices of Examples C1 to C3 were subjected to a durability test and thereafter, evaluation of the HC purification ratio (%) in a lean atmosphere and the oxygen consumption detection test of these catalysts were performed.

(Durability Test)

The durability test was performed by attaching the exhaust gas purification catalyst devices of each of Examples to an exhaust system of a V-8 cylinder engine, setting the temperature of the catalyst to 950° C., and holding this state over 100 hours.

(HC Purification Ratio in Lean Atmosphere)

After the durability test, the exhaust gas purification catalyst device of each of Examples was connected to an exhaust system of a L-4 cylinder engine of 2 L displacement, and the rotation speed of this engine was adjusted 2,000 rpm, the torque was adjusted to 77 Nm, and the air-fuel ratio was adjusted to 25 (composition of exhaust gas: NOx=110 ppm, HC=3,300 ppmC, CO=900 ppm, $O_2$=10%).

After the amount of NOx discharged from the engine reached a predetermined amount, the air-fuel ratio was controlled to 12.5 (rich atmosphere), the air-fuel ratio was subsequently controlled to 25 (lean atmosphere), and the HC purification ratio was measured. The results are depicted in FIG. 8.

Figure 8:
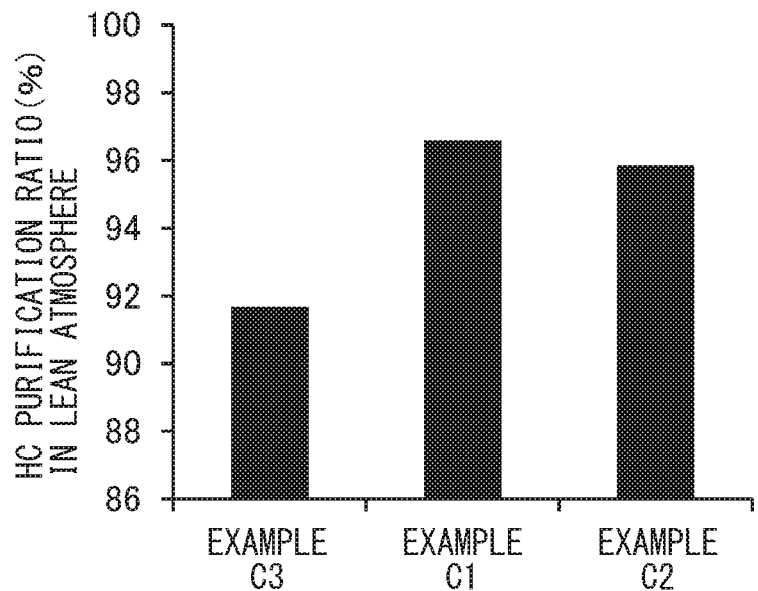
FIG. 8 is a diagram illustrating the HC purification ratio (%) in a lean atmosphere, regarding the exhaust gas purification catalyst device of Examples C1 to C3.

FIG. 8 is a diagram illustrating the HC purification ratio (%) in a lean atmosphere of the exhaust gas purification catalyst device of Examples C1 to C3. It is seen from FIG. 8 that the HC purification ratio decreases in the order of exhaust gas purification catalyst devices of Examples C1 to C3.

It is believed that, in the exhaust gas purification catalyst device of Example C1, since, in the second catalyst layer, a part of or all of Pd particles is supported on ceria and at the same time, ceria, Pd, and Rh are contained in a mixed state in the same layer, the HC purification ratio was enhanced. Furthermore, it is believed that, in the exhaust gas purification catalyst device of Example C2, since, in the second catalyst layer, a part of or all of Pd particles is supported on alumina and at the same time, ceria, Pd, and Rh are contained in a mixed state in the same layer, the HC purification ratio is relatively enhanced.

In the exhaust gas purification catalyst device of Example C3, a part of or all of Pd particles is supported on ceria in a short section in the upstream part of the second catalyst layer, but since ceria, Pd, and Rh are not contained in a mixed state in the same layer in a long section, the HC purification ratio is considered to become relatively low.

Furthermore, in the exhaust gas purification catalyst devices of Examples C1 to C3, in the first and second catalyst layers, the total mass of ceria having a fluorite-type structure per 1 L volume of the substrate is sufficiently small. Consequently, in the second catalyst layer, the relative amount of Pd (the amount of Pd relative to the amount of Rh) and the absolute amount of Pd can be increased, and a HC oxidation reaction can therefore be sufficiently catalyzed.

(Oxygen Consumption Detection Test)

After the durability test, an oxygen consumption detection test was performed. This oxygen consumption detection test is one of steps when detecting deterioration of the exhaust gas purification catalyst device.

In general, as the oxygen consumption in a lean atmosphere is larger, the accuracy of deterioration detection for an exhaust gas purification catalyst device is enhanced. However, in the exhaust gas purification catalyst devices of Examples C1 to C3, the amount of ceria, in particular, ceria having a fluorite-type structure, is small. Accordingly, whether the oxygen consumption of the exhaust gas purification catalyst devices of Examples C1 to C3 satisfies the amount necessary for deterioration detection even when the amount of ceria having the above-described structure is small, was evaluated.

The simple overview of the oxygen consumption detection test is as follows.

After the durability test, the exhaust gas purification catalyst device of each of Examples was connected to an exhaust system of a L-4 cylinder engine of 2 L displacement, and the rotation speed, the torque, and the air-fuel ratio were adjusted to 2,000 rpm, 77 Nm, and 25, respectively (composition of exhaust gas: NOx=110 ppm, HC=3,300 ppmC, CO=900 ppm, $O_2$=10%). After the integrated value of NOx emissions in a lean atmosphere, discharged from the engine, reached 300 mg, the air-fuel ratio of the exhaust gas was controlled to a rich atmosphere and subsequently, the air-fuel ratio of the exhaust gas was controlled to a lean atmosphere, in particular, a slightly lean atmosphere (oxygen concentration: from 1 to 2%, and the air fuel ratio: 15.0). The amount of oxygen consumed while the lean-atmosphere exhaust gas was being supplied was measured.

Figure 9:
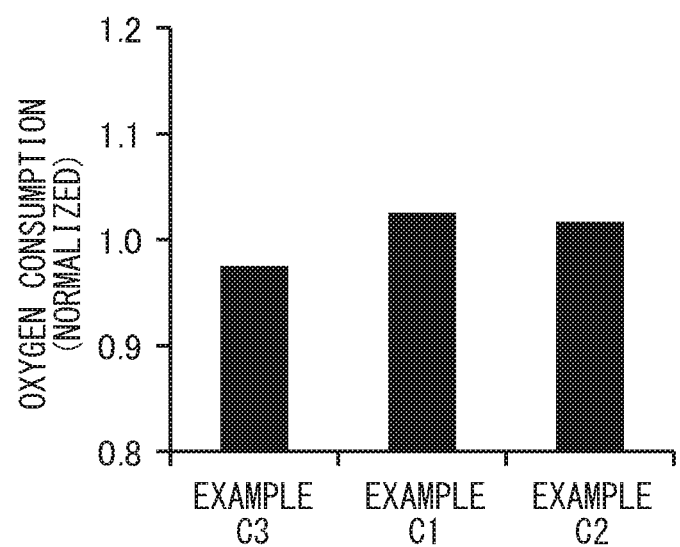
FIG. 9 is a diagram illustrating the oxygen consumption (normalized) of the exhaust gas purification devices of Examples C1 to C3 when, in an oxygen consumption detection test, the air-fuel ratio of the rich-atmosphere exhaust gas is 12.5.
Figure 10:
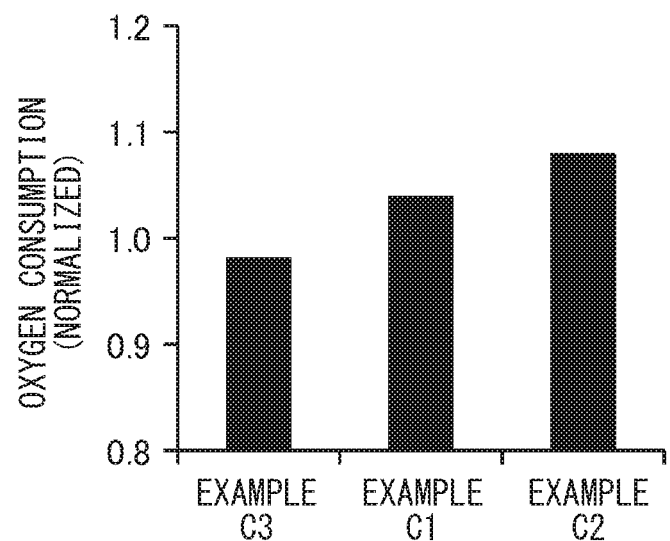
FIG. 10 is a diagram illustrating the oxygen consumption (normalized) of the exhaust gas purification devices of Examples C1 to C3 when, in an oxygen consumption detection test, the air-fuel ratio of the rich-atmosphere exhaust gas is 13.7.

At the time of controlling the air-fuel ratio of the exhaust gas to a rich atmosphere, two air-fuel ratios of 12.5 (A) and 13.7 (B) were employed, and the results are depicted in FIG. 9 and FIG. 10, respectively.

(A) When the Air-Fuel Ratio in a Rich Atmosphere was 12.5:

It is seen from FIG. 9 that the oxygen consumption decreases in the order of exhaust gas purification catalyst devices of Examples C1, C2 and C3.

As regards the degree of ceria reduction (the proportion of oxygen-released ceria) in a rich atmosphere having an air-fuel ratio of 12.5, it is believed that the reduction performance of the exhaust gas purification devices of Examples C1 and C2 is higher than that of Example C3.

This is because, in the exhaust gas purification catalyst device of Example C1, Pd is supported on ceria, the ceria exerts high OSC properties, and ceria reduction is therefore facilitated; and in Example C2, Pd is supported on alumina, this combination produces $H_2$, etc., having a high reduction performance, and these $H_2$, etc., reduce ceria. Accordingly, when the proportion of ceria in the oxygen released state is high in the exhaust gas purification catalyst device, the oxygen storage amount, in other words, the oxygen consumption in a lean atmosphere may be enhanced.

In the exhaust gas purification catalyst device of Example C1, it is believed that, since Pd is supported on ceria, among others, the oxygen storage amount in a lean atmosphere is enhanced.

It is believed that the efficiency of oxidation of HC, etc., in a lean atmosphere of the exhaust gas purification catalyst devices of Examples C1 and C2 is higher than that of the exhaust gas purification catalyst device of Example C3. This is because, in the exhaust gas purification catalyst devices of Examples C1 and C2, Pd is supported on each of ceria and alumina and has a large contact area with the exhaust gas, and therefore the catalytic activity of Pd is enhanced. Accordingly, the oxygen reaction amount, in other words, the oxygen consumption in a lean atmosphere may be enhanced.

The catalytic activity of Pd supported on a support is high particularly when the support is ceria (Example C1). In this case, the oxygen reaction amount in a lean atmosphere may be more enhanced.

Based on these facts and theory, it is understood that the oxygen consumption decreases in the order of exhaust gas purification catalyst devices of Examples C1, C2, and C3.

(B) When the Air-Fuel Ratio in a Rich Atmosphere was 13.7:

It is seen from FIG. 10 that the oxygen consumption decreases in the order of exhaust gas purification catalyst devices of Examples C2, C1 and C3.

As regards the degree of ceria reduction (the proportion of oxygen-released ceria) in a rich atmosphere having an air-fuel ratio of 13.7, it is believed that the reduction performance of the exhaust gas purification devices of Examples C1 and C2 is higher than that of Example C3.

The reason therefor is the same as the theory regarding the degree of ceria reduction of (A) above. Accordingly, when the proportion of oxygen-released ceria is high in the exhaust gas purification catalyst device, the oxygen storage amount, in other words, the oxygen consumption in a lean atmosphere may be enhanced.

In the case of a rich atmosphere where the air-fuel ratio is 13.7, the amount of a reducing agent (HC, etc.) is relatively small, In this case, it is believed that a combination of Pd and alumina supporting it (Example C2) is particularly advantageous to ceria reduction, because this combination can produce $H_2$, etc., having a high reduction performance. Accordingly, in this case, the oxygen storage amount in a lean atmosphere may be more enhanced.

It is believed that the efficiency of oxidation of HC, etc., in a lean atmosphere, of the exhaust gas purification catalyst devices of Examples C1 and C2 is higher than that of Example C3. The reason therefor is the same as the theory regarding the efficiency of oxidation of HC, etc., in a lean atmosphere of (A) above. Accordingly, when Pd is supported on ceria and/or alumina in the exhaust gas purification catalyst device, the oxygen reaction amount, in other words, the oxygen consumption in a lean atmosphere may be enhanced.

Based on these facts and theory, it is understood that the oxygen consumption decreases in the order of exhaust gas purification catalyst devices of Examples C2, C1 and C3.

Figure 11:
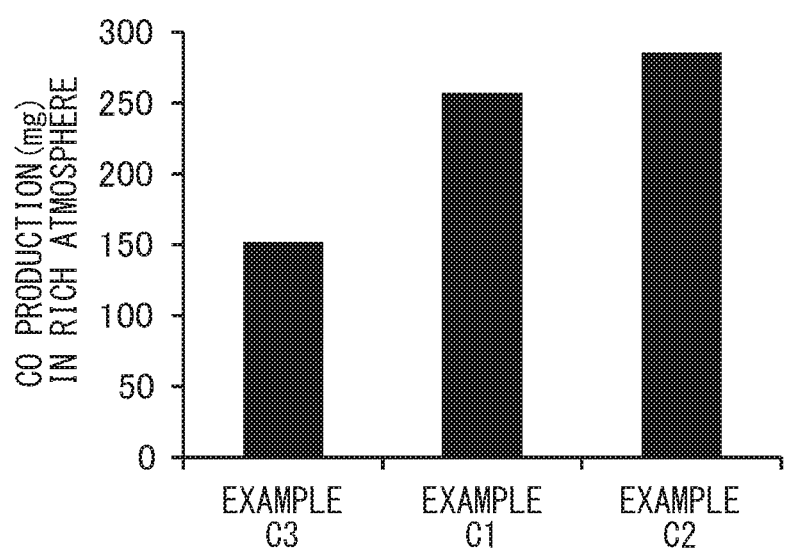
FIG. 11 is a diagram illustrating the CO production (mg) of the exhaust gas purification devices of Examples C1 to C3 when, in an oxygen consumption detection test, the air-fuel ratio of the rich-atmosphere exhaust gas is 13.7.

The CO production (mg) of the exhaust gas purification devices of Examples C1 to C3 when the air-fuel ratio of the rich-atmosphere exhaust gas is 13.7, is depicted in FIG. 11.

It is seen from FIG. 11 that the CO production in a rich atmosphere decreases in the order of exhaust gas purification catalyst devices of Examples C2, C1, and C3. It is believed that the reason therefor is that, in the exhaust gas purification catalyst device of Example C2, Pd is supported on alumina. In the exhaust gas purification catalyst device of Example C3 as well, Pd is supported on alumina, but it is believed that, since these are arranged in 22% of the whole length of the substrate, from upstream of the second catalyst layer, the contact area with the exhaust gas is small and the CO production is therefore reduced.

While the preferred embodiments of the present disclosure are described in detail, it will be understood by one skilled in the art that as regards the devices, instruments, chemicals, etc., used in the present disclosure, the manufacturers, grades, qualities, etc., thereof can be modified without departing from the scope of claims.

DESCRIPTION OF NUMERICAL REFERENCES 100, 200 Exhaust gas purification catalyst device
110, 210 Substrate
120, 220 First catalyst layer
130, 230 Second catalyst layer
231 Upstream part
232 Downstream part

What is claimed is:

1. An exhaust gas purification catalyst device comprising a substrate, a first catalyst layer comprising Pd and formed on a surface of the substrate, and a second catalyst layer formed on a surface of the first catalyst layer,
   wherein a catalyst metal in the first catalyst layer consists of Pd,
   wherein a catalyst metal in the second catalyst layer consists of Pd and Rh,
   wherein, in the second catalyst layer, ceria, Pd, and Rh are contained in a mixed state in the same layer,
   wherein, in the first and second catalyst layers, the total mass of ceria having a fluorite-type structure per 1 L volume of the substrate is 16.0 g or less, and
   wherein, in the second catalyst layer, the mass of Pd per 1 L volume of the substrate is 0.32 g or more.

2. The exhaust gas purification catalyst device according to claim 1, wherein, in the second catalyst layer, a part of or all of the Pd particles is supported on the ceria.

3. The exhaust gas purification catalyst device according to claim 1,
   wherein the second catalyst layer further comprises alumina, and wherein, in the second catalyst layer, a part of or all of the Pd particles is supported on the alumina.

4. The exhaust gas purification catalyst device according to claim 1, wherein, in the first and second catalyst layers, the total mass of ceria having a fluorite-type structure per 1 L volume of the substrate is 0.0 g or more.

5. The exhaust gas purification catalyst device according to claim 1, wherein, in the second catalyst layer, the mass of Pd per 1 L volume of the substrate is 0.64 g or less.

6. An exhaust gas purification system comprising an internal combustion engine for emitting an exhaust gas, a first catalyst device for treating the exhaust gas, and a second catalyst device for treating the exhaust gas treated in the first catalyst device,
   wherein the first catalyst device is the exhaust gas purification catalyst device according to claim 1, and
   wherein the second catalyst device is a catalyst device selected from a group consisting of a three-way catalyst device, a NOx storage reduction catalyst device, and a selective catalytic reduction catalyst device.

7. The exhaust gas purification system according to claim 6, further comprising a third catalyst device for treating the exhaust gas treated in the second catalyst device, wherein the third catalyst device is a catalyst device selected from a group consisting of a three-way catalyst device, a NOx storage reduction catalyst device, and a selective catalytic reduction catalyst device.

8. The exhaust gas purification system according to claim 7,
   wherein the second catalyst device is a NOx storage reduction catalyst device, and
   wherein the third catalyst is a selective catalytic reduction catalyst device.

9. The exhaust gas purification system according to claim 6, wherein the internal combustion engine is a lean burn engine.

10. A method for detecting deterioration of an exhaust gas purification catalyst device, which is a method for detecting deterioration of the first catalyst device in the exhaust gas purification system according to claim 6, comprising:
    supplying a rich-atmosphere exhaust gas to the first catalyst device, then supplying a lean-atmosphere exhaust gas with an oxygen concentration of 1 to 2% to the first catalyst device, and
    while supplying the lean-atmosphere exhaust gas, estimating the amount of oxygen consumed in the first catalyst device.

11. The method for detecting deterioration of an exhaust gas purification catalyst device according to claim 10, wherein the air-fuel ratio of the rich-atmosphere gas is from 12.5 to 13.7.

* * * * *